US008321114B2

(12) United States Patent
Kamado et al.

(10) Patent No.: US 8,321,114 B2

(45) Date of Patent: Nov. 27, 2012

(54) WORK VEHICLE AND WORK VEHICLE CONTROL METHOD

(75) Inventors: Mitsuhiko Kamado, Hirakata (JP); Kouji Ohhigashi, Duesseldorf (DE); Kouichi Miyatake, Hirakata (JP); Akinori Sugiura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/393,922

(22) PCT Filed: May 20, 2011

(86) PCT No.: PCT/JP2011/061613

§ 371 (c)(1),
(2), (4) Date: Mar. 28, 2012

(87) PCT Pub. No.: WO2011/145715

PCT Pub. Date: Nov. 24, 2011

(65) Prior Publication Data

US 2012/0185141 A1 Jul. 19, 2012

(30) Foreign Application Priority Data

May 20, 2010 (JP) ................................ 2010-116688
Nov. 19, 2010 (JP) ................................ 2010-259218

(51) Int. Cl.
*B60T 7/12* (2006.01)

(52) U.S. Cl. ........................ 701/84; 701/90; 123/406.23

(58) Field of Classification Search ........................ None
See application file for complete search history.

(56) References Cited

U.S. PATENT DOCUMENTS

| | | | | |
|---|---|---|---|---|
| 7,020,553 | B2 * | 3/2006 | Nakamura et al. | 701/50 |
| 2009/0320461 | A1 * | 12/2009 | Morinaga et al. | 60/431 |
| 2010/0107996 | A1 * | 5/2010 | Shintani et al. | 123/41.11 |

FOREIGN PATENT DOCUMENTS

| | | | |
|---|---|---|---|
| JP | 2-146279 | A | 6/1990 |
| JP | 10-220359 | A | 8/1998 |
| JP | 2003-83113 | A | 3/2003 |
| JP | 2007-120425 | A | 5/2007 |

OTHER PUBLICATIONS

International Search Report of corresponding PCT Application No. PCT/JP2011/061613.

* cited by examiner

*Primary Examiner* — David D Le
*Assistant Examiner* — Yazan A Soofi
(74) *Attorney, Agent, or Firm* — Global IP Counselors

(57) ABSTRACT

A control unit is configured to calculate a target absorption torque of a hydraulic pump at which the engine output torque and the absorption torque of the hydraulic pump match a target matching rotation speed of the engine. The control unit is configured to refer to command data, calculate a command current value corresponding to the target absorption torque, and output a command signal of the calculated value to a pump control device. The control unit is configured to calculate the absorption torque at calibration points at which there is an equilibrium state in which the output horsepower of the engine and the absorption horsepower of the hydraulic pump are matched. The control unit is configured to acquire calibration information including the calculated absorption torque and the command current value output to the pump control device in the equilibrium state, and calibrate the command data based on the calibration information.

13 Claims, 14 Drawing Sheets

WORK VEHICLE AND WORK VEHICLE CONTROL METHOD

CROSS-REFERENCE TO RELATED APPLICATIONS

This application claims priority to Japanese Patent Application Nos. 2010-116688 filed on May 20, 2010 and 2010-259218 filed on Nov. 19, 2010, the entire disclosures of which are hereby incorporated herein by reference.

TECHNICAL FIELD

The present invention relates to a work vehicle and to a control method for a work vehicle.

BACKGROUND ART

In work vehicles such as hydraulic excavators, bulldozers, and the like, a hydraulic pump is driven by an engine, and a hydraulic actuator is driven by hydraulic fluid discharged from the hydraulic pump. In such work vehicles, the engine and the hydraulic pump are controlled in such a way that the output torque of the engine and the absorption torque of the hydraulic pump are matched at a target matching rotation speed of the engine, as shown in Japanese Laid-open Patent Application 2007-120425. In specific terms, a target absorption torque of the hydraulic pump is calculated in such way that the output torque of the engine and the absorption torque of the hydraulic pump are matched to the target matching rotation speed.

Meanwhile, the absorption torque of the hydraulic pump is controlled through electrical control of a pump control device that controls the hydraulic pump. Specifically, the absorption torque of the hydraulic pump is controlled in accordance with a command value of a command signal to the pump control device. Once the target absorption torque is calculated in the above manner, a command value corresponding to the target absorption torque is calculated, and a command signal corresponding to this command value is input to the pump control device. Herein, the command value of the command signal is calculated making reference to command data. The command data is information showing correspondence between the command value of the command signal to the pump control device, and the absorption torque of the hydraulic pump. Command data is composed of data prepared beforehand through experimentation in the work vehicle design stage, and is stored in a storage unit.

SUMMARY

However, the relationship between command values of a command signal to a pump control device and the absorption torque of a hydraulic pump may vary by individual hydraulic pump, even within those of the same model. Therefore, even if a command value of a command signal corresponding to the target absorption torque is calculated on the basis of command data that was created uniformly without regard for differences among individual hydraulic pumps, there may be instances in which the actual absorption torque of the hydraulic pump does not accurately approximate the target absorption torque. In cases in which the actual absorption torque of the hydraulic pump differs from the target absorption torque, the output torque of the engine and the absorption torque of the hydraulic pump will equilibrate at an engine rotation speed different from the target matching engine rotation speed. Consequently, variability of the relationship between command values and absorption torque due to differences among individual hydraulic pumps can cause variability of fuel consumption performance or working performance of the work vehicle. An object of the present invention is to provide a work vehicle in which absorption torque can be controlled accurately regardless of individual differences among hydraulic pumps, and a method for controlling a work vehicle.

The work vehicle according to a first aspect of the present invention is provided with an engine, a hydraulic pump, a hydraulic actuator, a pump control device, a storage unit, and a control unit. The hydraulic pump is driven by the engine. The hydraulic actuator is driven by hydraulic fluid discharged from the hydraulic pump. The pump control device controls the absorption torque of the hydraulic pump in accordance with a command value of an input command signal. The storage unit stores command data showing correspondence between command values of a command signal to the pump control device, and the absorption torque of the hydraulic pump. The control unit is configured to calculate a target absorption torque of the hydraulic pump such that the output torque of the engine and the absorption torque of the hydraulic pump are matched at a target matching rotation speed of the engine. The control unit is configured to refer to the command data when calculating a command value corresponding to the target absorption torque. The control unit is configured to output a command signal of the calculated command value to the pump control device. The control unit is configured to calculate the absorption torque of the hydraulic pump in an equilibrium state in which the output horsepower of the engine and the absorption horsepower of the hydraulic pump are matched. The control unit is configured to acquire calibration information including the calculated absorption torque of the hydraulic pump and the command value of the command signal being output to the pump control device in the equilibrium state. The control unit is configured to calibrate the command data on the basis of the calibration information.

The work vehicle according to a second aspect of the present invention provides a work vehicle according to the first aspect, wherein the control unit is configured to acquire the respective calibration information in a plurality of equilibrium states in which the absorption torques differ, and calibrate the command data on the basis of the plurality of acquired calibration information.

The work vehicle according to a third aspect of the present invention provides a work vehicle according to the second aspect, wherein the engine is controlled on the basis of engine output torque lines specifying a relationship between engine rotation speed and upper limit values of engine output torque. The control unit is configured to acquire calibration information in the plurality of equilibrium states corresponding to the plurality of mutually different engine output torque lines.

The work vehicle according to a fourth aspect of the present invention provides a work vehicle according to the second aspect, wherein the hydraulic pump is controlled on the basis of pump absorption torque lines specifying a relationship between engine rotation speed and absorption torque of the hydraulic pump. The control unit is configured to acquire calibration information in a plurality of equilibrium states corresponding to the plurality of mutually different pump absorption torque lines.

The work vehicle according to a fifth aspect of the present invention provides a work vehicle according to any of the first to fourth aspects, further provided with a relief device. The relief device is furnished to a hydraulic circuit that supplies hydraulic fluid from the hydraulic pump to the hydraulic actuator. The relief device enters a relief state when the hydraulic pressure of the hydraulic circuit reaches a relief pressure, whereby preventing the hydraulic pressure of the hydraulic circuit from exceeding the relief pressure. The command data is calibrated when the relief device is in the relief state.

The work vehicle according to a sixth aspect of the present invention provides a work vehicle according to any of the first to fourth aspects, further provided with a relief device and a calibration relief device. The relief device is furnished to a hydraulic circuit that supplies hydraulic fluid from the hydraulic pump to the hydraulic actuator. The relief device enters a relief state when the hydraulic pressure of the hydraulic circuit reaches a relief pressure, whereby preventing the hydraulic pressure of the hydraulic circuit from exceeding the relief pressure. The calibration relief device is furnished to the hydraulic circuit, and enters a relief state at a lower hydraulic pressure than the relief pressure of the relief device. The command data is calibrated when the calibration relief device is in the relief state.

The work vehicle according to a seventh aspect of the present invention provides a work vehicle according the fifth aspect, further provided with a second hydraulic pump, a second hydraulic actuator, a second pump control device, and a confluent/divided flow switching device. The second hydraulic pump is driven by the engine. The second hydraulic actuator is driven by hydraulic fluid discharged from the second hydraulic pump. The second pump control device controls the absorption torque of the second hydraulic pump in accordance with a command value of an input command signal. The confluent/divided flow switching device switches between a confluent flow state and a divided flow state. When the confluent/divided flow switching device is in the confluent flow state, a hydraulic circuit for supplying hydraulic fluid from the hydraulic pump to the hydraulic actuator, and a second hydraulic circuit for supplying hydraulic fluid from the second hydraulic pump to the second hydraulic actuator are merged each other. When the confluent/divided flow switching device is in the divided flow state, the hydraulic circuit and the second hydraulic circuit are divided each other. A predetermined controlling hydraulic pressure controlled by the hydraulic circuit and the second hydraulic circuit is input to the pump control device and the second pump control device. The pump control device regulates the discharge flow rate of the hydraulic pump in accordance with the controlling hydraulic pressure, in a manner such that absorption torque of the hydraulic pump does not exceed a value in accordance with a command value of a command signal input from the control unit. The second pump control device regulates the discharge flow rate of the second hydraulic pump in accordance with the controlling hydraulic pressure, in a manner such that absorption torque of the second hydraulic pump does not exceed a value in accordance with a command value of a command signal input from the control unit. The command data is calibrated when the confluent/divided flow switching device is in the divided flow state, the relief device is in the relief state, and the hydraulic pressure of the second hydraulic circuit is a predetermined low hydraulic pressure lower than the relief pressure.

The work vehicle according to an eighth aspect of the present invention provides a work vehicle according to any of the first to seventh aspects, wherein calibration of the command data is executed when a calibration mode for calibration of the command data is selected.

The work vehicle according to a ninth aspect of the present invention provides a work vehicle according to the eighth aspect, further provided with an input device operated for instructing selection of the calibration mode.

The control method for a work vehicle according to a tenth aspect of the present invention is a method for controlling a work vehicle provided with an engine, a hydraulic pump, a hydraulic actuator, a pump control device, and a storage unit. The hydraulic pump is driven by the engine. The hydraulic actuator is driven by hydraulic fluid discharged from the hydraulic pump. The pump control device controls the absorption torque of the hydraulic pump in accordance with a command value of an input command signal. The storage unit stores command data showing correspondence between command values of a command signal to the pump control device, and the absorption torque of the hydraulic pump. The control method for a work vehicle is provided with the following steps: a step of calculating a target absorption torque of the hydraulic pump such that the output torque of the engine and the absorption torque of the hydraulic pump are matched at a target matching rotation speed of the engine; a step of referring to the command data when calculating a command value corresponding to the target absorption torque, and outputting a command signal of the calculated command value to the pump control device; a step of calculating the absorption torque of the hydraulic pump in an equilibrium state in which the output horsepower of the engine and the absorption horsepower of the hydraulic pump are matched; a step of acquiring calibration information including the calculated absorption torque of the hydraulic pump, and the command value of the command signal being output to the pump control device in the equilibrium state; and a step of calibrating the command data on the basis of the calibration information.

The control method for a work vehicle according to an eleventh aspect of the present invention provides a control method for a work vehicle according to the tenth aspect, wherein the work vehicle is further provided with a relief device. The relief device is furnished to a hydraulic circuit that supplies hydraulic fluid from the hydraulic pump to the hydraulic actuator. The relief device enters a relief state when the hydraulic pressure of the hydraulic circuit reaches a relief pressure, whereby preventing the hydraulic pressure of the hydraulic circuit from exceeding the relief pressure. The command data is calibrated when the relief device is in the relief state.

The control method for a work vehicle according to a twelfth aspect of the present invention provides a control method for a work vehicle according to the eleventh aspect, wherein the work vehicle is further provided with a second hydraulic pump, a second hydraulic actuator, a second pump control device, and a confluent/divided flow switching device. The second hydraulic pump is driven by the engine. The second hydraulic actuator is driven by hydraulic fluid discharged from the second hydraulic pump. The second pump control device controls the absorption torque of the second hydraulic pump in accordance with a command value of an input command signal. The confluent/divided flow switching device switches between a confluent flow state and a divided flow state. When the confluent/divided flow switching device is in the confluent flow state, a hydraulic circuit for supplying hydraulic fluid from the hydraulic pump to the hydraulic actuator, and a second hydraulic circuit for supplying hydraulic fluid from the second hydraulic pump to the second hydraulic actuator are merged each other. When the confluent/divided flow switching device is in the divided flow state, the hydraulic circuit and the second hydraulic circuit are divided each other. A predetermined controlling hydraulic pressure controlled by the hydraulic circuit and the second hydraulic circuit is input to the pump control device and the second pump control device. The pump control device regulates the discharge flow rate of the hydraulic pump in accordance with the predetermined controlling hydraulic pressure, in a manner such that absorption torque of the hydraulic pump does not exceed a value in accordance with a command value of a command signal input from the control unit. The second pump control device regulates the discharge flow rate of the second hydraulic pump in accordance with the predetermined controlling hydraulic pressure, in a manner such that absorption torque of the second hydraulic pump does not exceed a value in accordance with a command value of a command signal input from the control unit. The command data is calibrated when the confluent/divided flow switching device is in the divided flow state, the relief device is in the relief state, and the hydraulic pressure of the second hydraulic circuit is a predetermined low hydraulic pressure lower than the relief pressure.

The control method for a work vehicle according to a thirteenth aspect of the present invention provides a control method for a work vehicle according to the twelfth aspect, wherein the work vehicle is further provided with an unload device. The unload device enters an unload state when the supply of hydraulic fluid to the second hydraulic actuator via the second hydraulic circuit is blocked, and thereby reduces the hydraulic pressure of the second hydraulic circuit to an unload pressure lower than the relief pressure. The command data is calibrated when the confluent/divided flow switching device is in the divided flow state, the relief device is in the relief state, and the unload device is in the unload state.

In the work vehicle according to the first aspect of the present invention, calibration information is acquired by calculating actual absorption torque of the hydraulic pump in an equilibrium state in which the output horsepower of the engine and the absorption horsepower of the hydraulic pump are matched. In the equilibrium state, the output horsepower of the engine and the absorption horsepower of the hydraulic pump are matched and are into a stable state. The command data is then calibrated on the basis of calibration information. In so doing, the absorption torque of the hydraulic pump can be controlled with good accuracy regardless of individual differences among hydraulic pumps.

In the work vehicle according to the second aspect of the present invention, calibration information is acquired in a plurality of equilibrium states of different pump absorption torque. Therefore, the command data can be calibrated with better accuracy, as compared with a case in which calibration information is acquired in a single equilibrium state only.

In the work vehicle according to the third aspect of the present invention, calibration information is acquired in a plurality of equilibrium states corresponding to a plurality of mutually different engine output torque lines. In so doing, calibration information can be acquired in a plurality of equilibrium states of different pump absorption torque.

In the work vehicle according to the fourth aspect of the present invention, calibration information is acquired in a plurality of equilibrium states corresponding to a plurality of mutually different pump absorption torque lines. In so doing, calibration information can be acquired in a plurality of equilibrium states of different pump absorption torque.

In the work vehicle according to the fifth aspect of the present invention, the command data is calibrated when the relief device is in the relief state. Therefore, calibration information can be acquired in a state in which a predetermined load is placed on the hydraulic pump, and the output horsepower of the engine and the absorption horsepower of the hydraulic pump are stably matched. In so doing, the command data can be calibrated accurately.

In the work vehicle according to the sixth aspect of the present invention, calibration of the command data can be performed in a state in which the hydraulic pressure of the hydraulic circuit is lower than the relief pressure. The discharge pressure that is frequently used during normal operation is normally lower than the relief pressure. Therefore, the calibration accuracy of the command data in a state approximating that during normal operation can be improved.

In the work vehicle according to the seventh aspect of the present invention, the command data is calibrated in a state in which a controlling hydraulic pressure of relief pressure and of a predetermined low hydraulic pressure lower than the relief pressure is input to the pump control device and the second pump control device. Therefore, calibration of the command data can be performed in a state in which hydraulic pressure lower than the relief pressure is input to the pump control device and the second pump control device. In so doing, the calibration accuracy of the command data in a state approximating that during normal operation can be improved. Moreover, as there is no need for a separate additional relief device that enters a relief state at lower pressure than the relief pressure, the increase in manufacturing costs can be minimized.

In the work vehicle according to the eighth aspect of the present invention, calibration of the command data is executed when a calibration mode for calibration of command data is selected. Therefore, control during normal operation of the work vehicle can be stabilized.

In the work vehicle according to the ninth aspect of the present invention, the calibration mode is selected manually through operation of an input device. Therefore, calibration of command data can be executed at any time, such as when the work vehicle is shipped, or during maintenance.

In the control method for a work vehicle according to the tenth aspect of the present invention, calibration information is acquired by calculating the actual absorption torque of the hydraulic pump in an equilibrium state in which the output horsepower of the engine and the absorption horsepower of the hydraulic pump are matched. The command data is then calibrated based on the calibration information. In so doing, the absorption torque of the hydraulic pump can be controlled with better accuracy regardless of individual differences among hydraulic pumps.

In the control method for a work vehicle according to the eleventh aspect of the present invention, the command data is calibrated when the relief device is in the relief state. Therefore, calibration information can be acquired in a state in which a predetermined load is placed on the hydraulic pump, and the output horsepower of the engine and the absorption horsepower of the hydraulic pump are stably matched. In so doing, the command data can be calibrated more accurately.

In the control method for a work vehicle according to the twelfth aspect of the present invention, the command data is calibrated in a state in which a controlling hydraulic pressure of relief pressure and of a predetermined low hydraulic pressure lower than the relief pressure is input to the pump control device and the second pump control device. Therefore, calibration of the command data can be performed in a state in which hydraulic pressure lower than the relief pressure is input to the pump control device and the second pump control device. In so doing, the calibration accuracy of the command data in a state approximating that during normal operation can be improved. Moreover, as there is no need for a separate additional relief device that enters a relief state at lower pressure than the relief pressure, the increase in manufacturing costs can be minimized.

In the control method for a work vehicle according to the thirteenth aspect of the present invention, the command data is calibrated in a state in which a controlling hydraulic pressure of relief pressure and of unload pressure is input to the pump control device and the second pump control device. The unload pressure is a hydraulic pressure lower than the relief pressure. Therefore, calibration of the command data can be performed in a state in which hydraulic pressure lower than the relief pressure is input to the pump control device and the second pump control device. In so doing, the calibration accuracy of the command data in a state approximating that during normal operation can be improved. Moreover, as there is no need for a separate additional relief device that enters a relief state at lower pressure than the relief pressure, the increase in manufacturing costs can be minimized.

DETAILED DESCRIPTION OF THE PREFERRED EMBODIMENTS

Figure 1:
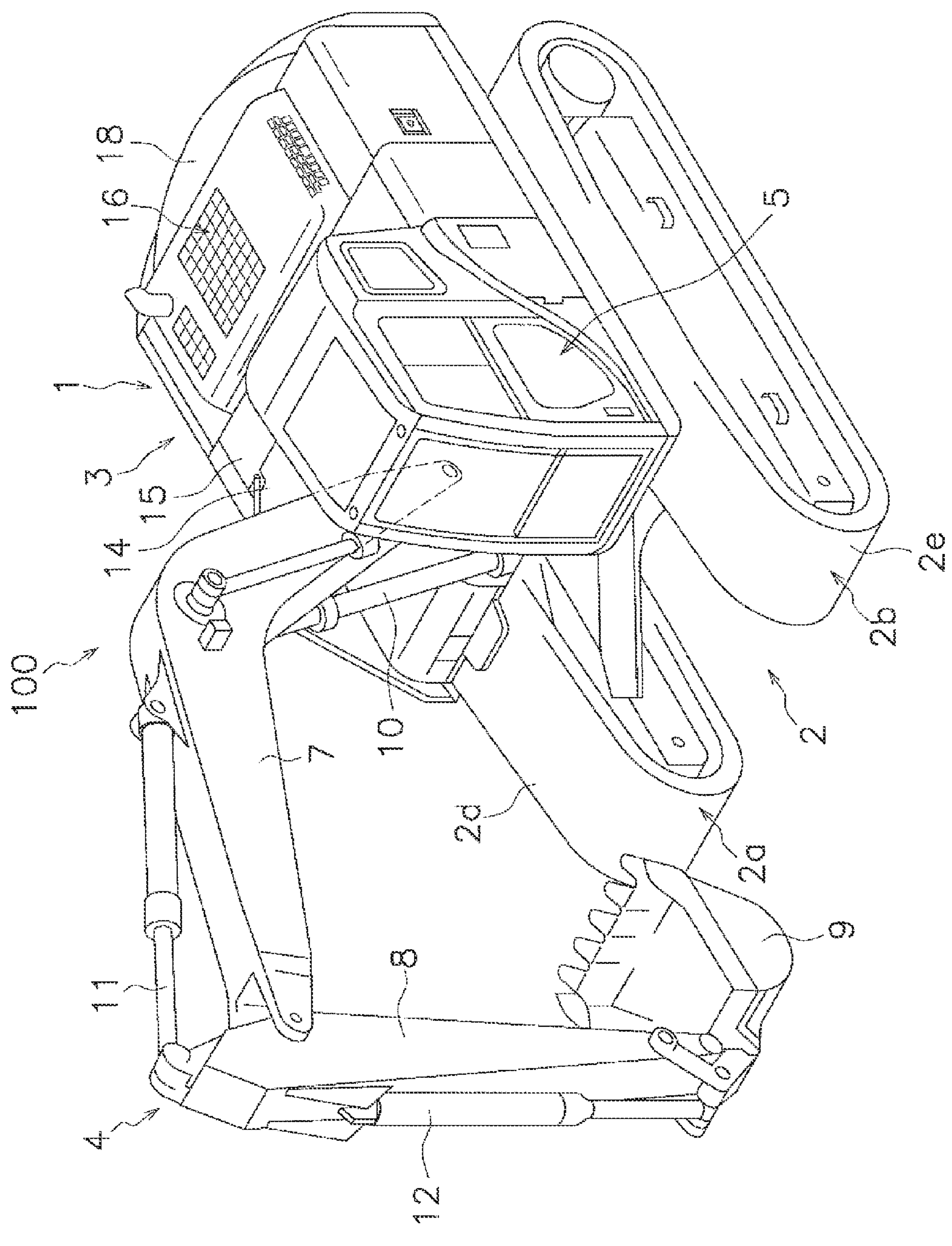
FIG. 1 is a perspective view of a work vehicle according to a first embodiment of the present invention.

A work vehicle 100 according to a first embodiment of the present invention is shown in FIG. 1. This work vehicle 100 is a hydraulic excavator provided with a vehicle body 1 and a work machine 4.

The vehicle body 1 has a traveling unit 2 and a revolving unit 3. The traveling unit 2 includes a pair of traveling devices 2*a*, 2*b*. The traveling devices 2*a*, 2*b* include crawler tracks 2*d*, 2*e*. The traveling devices 2*a*, 2*b* drive the crawler tracks 2*d*, 2*e* by a right travel motor 31 and a left travel motor 32, to be discussed below (see FIG. 2), thereby causing the work vehicle 100 to travel.

The revolving unit 3 is installed on the traveling unit 2. The revolving unit 3 is furnished in revolvable fashion with respect to the traveling unit 2, and revolves when driven by a revolution motor 30 (see FIG. 2), to be discussed below. An operator's cab 5 is also furnished to the revolving unit 3. The revolving unit 3 includes a fuel tank 14, a hydraulic fluid tank 15, an engine compartment 16, and a counterweight 18. The fuel tank 14 holds fuel for driving an engine 21 (see FIG. 2), to be discussed below. The hydraulic fluid tank 15 holds hydraulic fluid which is discharged from a hydraulic pump 25 (see FIG. 2), to be discussed below. The engine compartment 16 houses equipment such as the engine 21 and the hydraulic pump 25, to be discussed below. The counterweight 18 is disposed rearward of the engine compartment 16.

The work machine 4 is attached at a center position of the front of the revolving unit 3, and includes a boom 7, an arm 8, a bucket 9, a boom cylinder 10, an arm cylinder 11, and a bucket cylinder 12. The basal end of the boom 7 is rotatably linked to the revolving unit 3. Also, the distal end of the boom 7 is rotatably linked to the basal end of the arm 8. The distal end of the arm 8 is rotatably linked to the bucket 9. The boom cylinder 10, the arm cylinder 11, and the bucket cylinder 12 are hydraulic cylinders which are driven by hydraulic fluid discharged from the hydraulic pump 25, to be discussed below. The boom cylinder 10 operates the boom 7. The arm cylinder 11 operates the arm 8. The bucket cylinder 12 operates the bucket 9. The work machine 4 is driven through driving of these cylinders 10, 11, 12.

Figure 2:
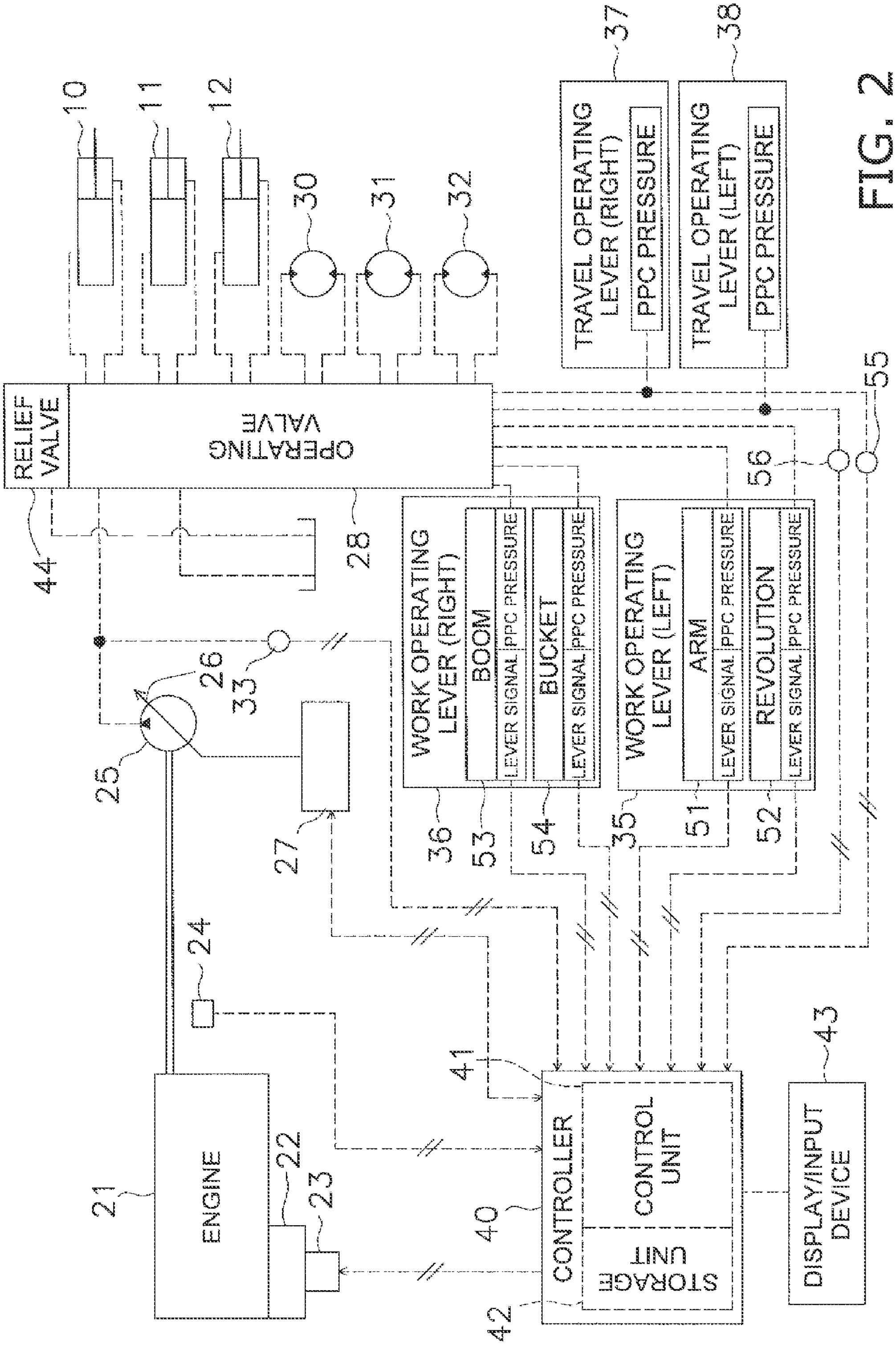
FIG. 2 is a block diagram showing the configuration of a control system of the work vehicle according to a first embodiment of the present invention.

A configuration diagram of the control system of the work vehicle 100 is shown in FIG. 2. The engine 21 is a diesel engine, and the output horsepower thereof is controlled by regulating the amount of fuel injected into the cylinders. This regulation is performed under the control of a command signal from a controller 40, by an electronic governor 23 equipped to a fuel injection pump 22 of the engine 21. An ordinary all-speed control governor is employed as the governor 23, and the engine rotation speed and the amount of fuel injection are regulated in accordance with the load, so as to bring the engine rotation speed to a target rotation speed, to be discussed later. Specifically, the governor 23 increases or decreases the amount of fuel injection in such a way as to eliminate deviation between the target rotation speed and the actual engine rotation speed. The actual rotation speed of the engine 21 is detected by a rotation sensor 24. The actual rotation speed of the engine 21 detected by the rotation sensor 24 is input in the form of a detection signal to the controller 40, to be discussed below.

The drive shaft of the hydraulic pump 25 is linked to the output shaft of the engine 21. The hydraulic pump 25 is driven by rotation of the output shaft of the engine 21. The hydraulic pump 25 is a variable displacement hydraulic pump, and the discharge flow rate changes by changing the tilting angle of a swash plate 26.

The pump control device 27 is operated by a command signal input from the controller 40, and controls the hydraulic pump 25 via a servo piston. A command value (command current value) of the command signal for input to the pump control device 27 is determined by the controller 40 in such a way that the product of the discharge pressure of the hydraulic pump 25 and the discharge flow rate of the hydraulic pump 25 does not exceed the pump absorption torque setting. At this time, the controller 40 employs command data, to be discussed later, to determine the command value.

The hydraulic fluid discharged from the hydraulic pump 25 is supplied to the various hydraulic actuators via an operating valve 28. Specifically, the hydraulic fluid is supplied to the boom cylinder 10, the arm cylinder 11, the bucket cylinder 12, the revolution motor 30, the right travel motor 31, and the left travel motor 32. The boom cylinder 10, the arm cylinder 11, the bucket cylinder 12, the revolution motor 30, the right travel motor 31, and the left travel motor 32 are respectively driven thereby, to operate the boom 7, the arm 8, the bucket 9, the revolving unit 3, and the crawler tracks 2*d* and 2*e* of the traveling unit 2. The discharge pressure of the hydraulic pump 25 is detected by a hydraulic pressure sensor 33, and input to the controller 40 in the form of a detection signal.

A left work operating lever 35, a right work operating lever 36, a right travel operating lever 37, and a left travel operating lever 38 are furnished inside the operator's cab 5 of the work vehicle 100.

The left work operating lever 35 is an operating lever for operation of the arm 8 or the revolving unit 3, and operates the arm 8 or the revolving unit 3 according to a manual control direction. The operating lever 35 operates the arm 8 or the revolving unit 3 at a speed in accordance with a manual control level. The operating lever 35 is furnished with sensors 51, 52 for detecting the manual control direction and the manual control level. The sensors 51, 52 input to the controller 40 lever signals which show the manual control direction and the manual control level of the operating lever 35. In a case in which the operating lever 35 is controlled in a direction for operating the arm 8, an arm lever signal that shows an arm excavation manual control level or an arm dumping manual control level, depending on the direction of tilt and amount of tilt of the operating lever 35 with respect to a neutral position, is input to the controller 40. In a case in which the operating lever 35 is manually controlled in a direction for operating the rotating body 3, a rotation lever signal that shows a right rotation manual control level or a left rotation manual control level, depending on the direction of tilt and amount of tilt of the operating lever 35 with respect to a neutral position, is input to the controller 40.

Also, when the operating lever 35 is manually controlled in a direction for operating the arm 8, a pilot pressure (PPC pressure) depending on the amount of tilt of the operating lever 35 is applied to an operating valve 28 pilot port corresponding to the lever tilt direction (an arm excavation direction or arm dumping direction). Likewise, when the operating lever 35 is manually controlled in a direction for operating the revolving unit 3, a pilot pressure (PPC pressure) depending on the amount of tilt of the operating lever 35 is applied to a controller 40 pilot port corresponding to the lever tilt direction (a right revolution direction or left revolution direction).

The right work operating lever 36 is an operating lever for operating the boom 7 or the bucket 9, and operates the boom 7 or the bucket 9 according to a manual control direction. The operating lever 36 operates the boom 7 or the bucket 9 at a speed in accordance with a manual control level. Like the operating lever 35 discussed above, the operating lever 36 is furnished with sensors 53, 54 for detecting the manual control direction and the manual control level. Also, like the operating lever 35 discussed above, a pilot pressure (PPC pressure) depending on the amount of tilt of the operating lever 36 is applied to an operating valve 28 pilot port corresponding to the lever tilt direction.

The right travel operating lever 37 and the left travel operating lever 38 are operating levers for operating the respective crawler tracks 2*d* and 2*e*. The operating levers 37 and 38 operate the crawler tracks 2*d* and 2*e* in accordance with the manual control direction, and operate the crawler tracks 2*d* and 2*e* at a speed in accordance with the manual control level. Like the operating lever 35, pilot pressure (PPC pressure) in accordance with the amount of tilt of the operating levers 37 and 38 is applied to the operating valve 28 pilot port corresponding to the lever tilt direction. This pilot pressure (PPC pressure) is detected by hydraulic pressure sensors 55 and 56, and input to the controller 40 in the form of a detection signal.

A display/input device 43 displays information of various kinds about the work vehicle 100, such as the engine rotation speed, the hydraulic fluid temperature, and the like. The display/input device 43 includes a touchpanel monitor, and functions as an input device controlled by an operator. The display/input device 43 is controlled for the purpose of commanding calibration of command data, to be discussed later.

The operating valve 28 is a flow rate directional control valve having a plurality of control valves that correspond to the hydraulic actuators 10 to 12 and 30 to 32. The operating valve 28 brings about travel of a spool in a direction in accordance with the manual control direction of the operating levers 35 to 38, and brings about travel of the spool so as to open up a fluid passage of an opening cross-sectional area in accordance with the manual control level of the operating levers 35 to 38.

A relief valve 44 is furnished to the hydraulic circuit linking the hydraulic pump 25 and the hydraulic actuators 10 to 12 and 30 to 32. When the hydraulic pressure of the hydraulic circuit rises to a predetermined relief pressure, the relief valve 44 connects the hydraulic circuit to a drain circuit. Therefore, the hydraulic pressure of the hydraulic circuit is controlled so as not to exceed the relief pressure.

The controller 40 is realized through a computer having a memory such as a RAM and a ROM; devices such as a CPU; and the like. The controller 40 includes a storage unit 42 for storing data and programs necessary for controlling the work vehicle 100; and a control unit 41 for executing various operations on the basis of the programs and data.

Figure 3:
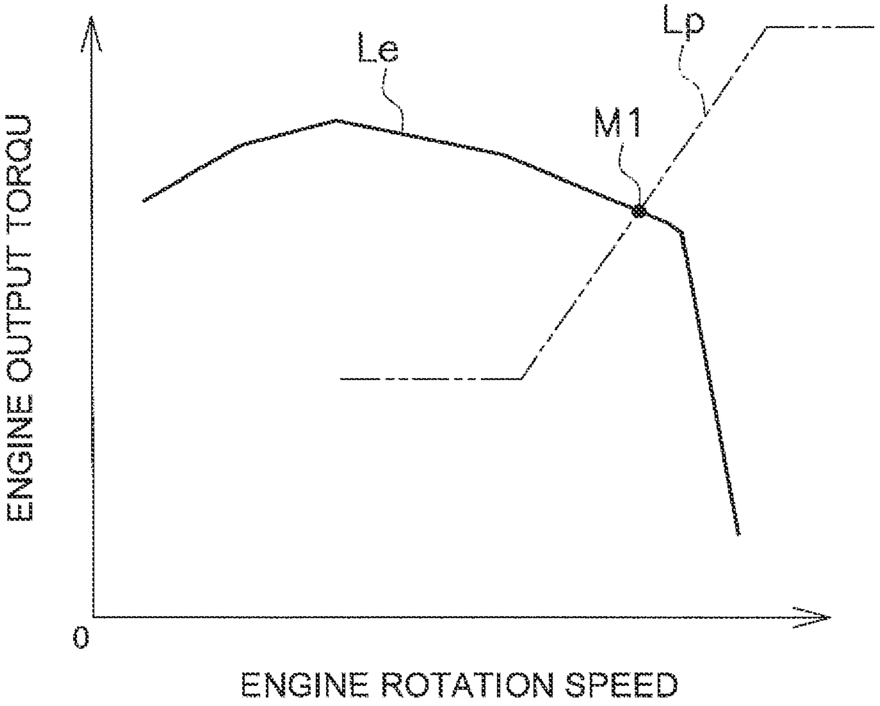
FIG. 3 is a diagram showing an output torque line of an engine and an absorption torque line of a hydraulic pump.

The controller 40 sends a command signal to the governor 23, to bring the engine rotation speed to a set target rotation speed. The target rotation speed is set, for example, by a target rotation speed setting member (not shown) furnished inside the operator's cab. The controller 40 calculates and sets the target rotation speed in accordance with manual control levels of the operating levers 36 to 38, or the load on the hydraulic pump 25. The engine 21 is controlled by controller 40 on the basis of an engine output torque line as shown by Le in FIG. 3. The engine output torque line represents upper limit values of torque that can be output in accordance with rotation speed of the engine 21. Specifically, the engine output torque line specifies a relationship between engine rotation speed and maximum values of output torque of the engine 21. The engine output torque line is stored in the storage unit 42. The controller 40 modifies the engine output torque line in accordance with the target rotation speed setting. Le in FIG. 3 shows the engine output torque line at the target rotation speed that is the maximum target rotation speed. This engine output torque line corresponds, for example, to the rated or maximum power output of the engine 21. The governor 23 controls the output of the engine 21 so that the output torque of the engine 21*n* does not exceed the engine output torque line.

The controller 40 calculates a target absorption torque of the hydraulic pump 25 in accordance with the target rotation speed of the engine 21. As shown in FIG. 3, this target absorption torque is set in such a way that the output torque of the engine 21 and the absorption torque of the hydraulic pump 25 match at a target matching rotation speed M1. The controller 40 calculates the target absorption torque on the basis of a pump absorption torque line like that shown by Lp in FIG. 3. The pump absorption torque line specifies a relationship between engine rotation speed and absorption torque of the hydraulic pump 25, and is stored in the storage unit 42.

The controller 40 calculates a command current value corresponding to the target absorption torque of the hydraulic pump 25. Command data showing correspondence between command current values for the pump control device 27 and the absorption torque of the hydraulic pump 25 are stored in the storage unit 42. This command data shows a functional relationship whereby command current values increase in association with increasing target absorption torque (see FIG. 10). The controller 40 refers to the command data, and calculates a command current value corresponding to the present target absorption torque. A command signal of the calculated command current value is then output to the pump control device 27.

When a predetermined input manual control for selecting the calibration mode is performed on the display/input device 43, the controller 40 calibrates the command data. The calibration mode is a control mode for calibrating the command data, and differs from the normal operating mode of travel or work by the work machine 4. It is possible, for example, for the calibration mode to be selected by displaying on the display/input device 43 a service screen for use during maintenance of the work vehicle 100. The calibration process of command data executed by the controller 40 is described below. It is assumed that pre-calibration command data (herein called "initial command data") has been stored in the storage unit 42 prior to execution of the calibration process. The initial command data is command data that has been input, for example, at the time of manufacture of the work vehicle 100.

Figure 4:
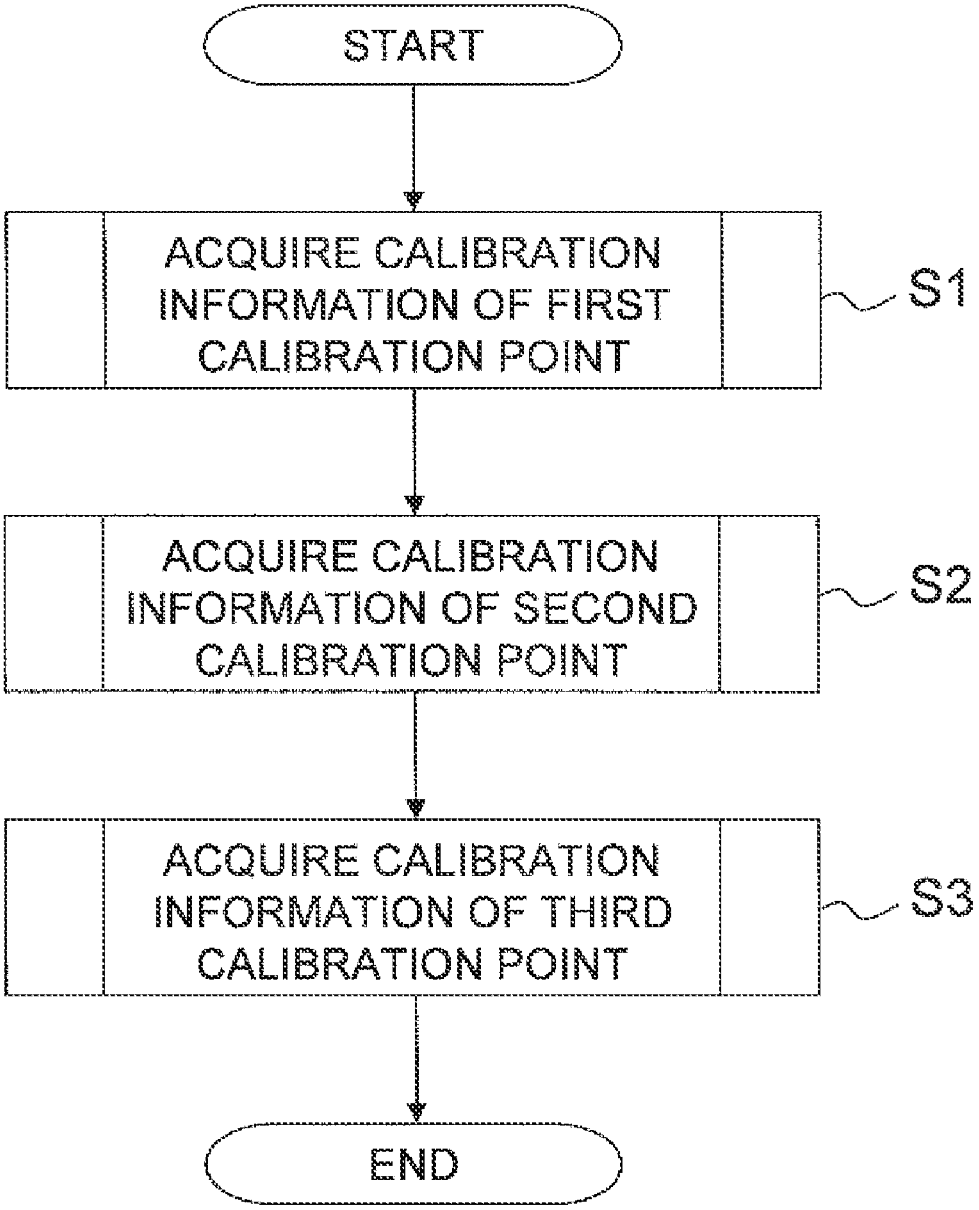
FIG. 4 is a flowchart showing a command data calibration process.
Figure 5:
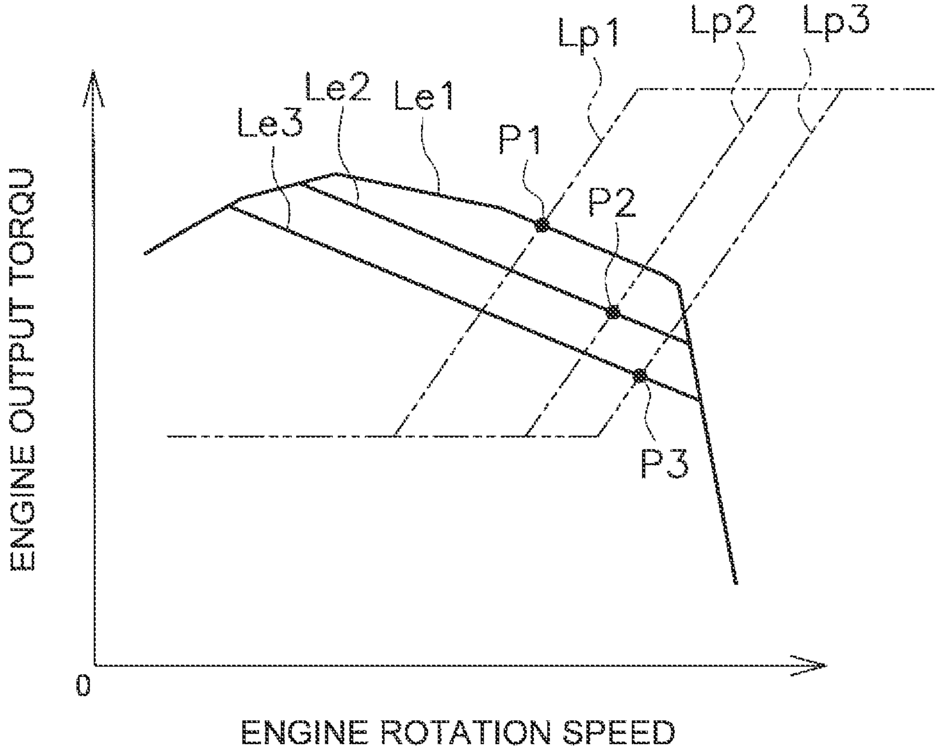
FIG. 5 is a diagram showing calibration points employed in a calibration process.

A flowchart showing the command data calibration process is shown in FIG. 4. In Step S1 to Step S3, acquisition of calibration information for a first calibration point, acquisition of calibration information for a second calibration point, and acquisition of calibration information for a third calibration point are respectively executed. As shown in FIG. 5, the first calibration point P1, the second calibration point P2, and the third calibration point P3 are points determined beforehand for use in the calibration process, and show engine rotation speed and absorption torque of the hydraulic pump 25 in equilibrium states in which the output horsepower of the engine 21 and the absorption horsepower of the hydraulic pump 25 are matched. The first calibration point P1, the second calibration point P2, and the third calibration point P3 are set in such a way that different values of hydraulic pump 25 absorption torque can be calculated.

Figure 6:
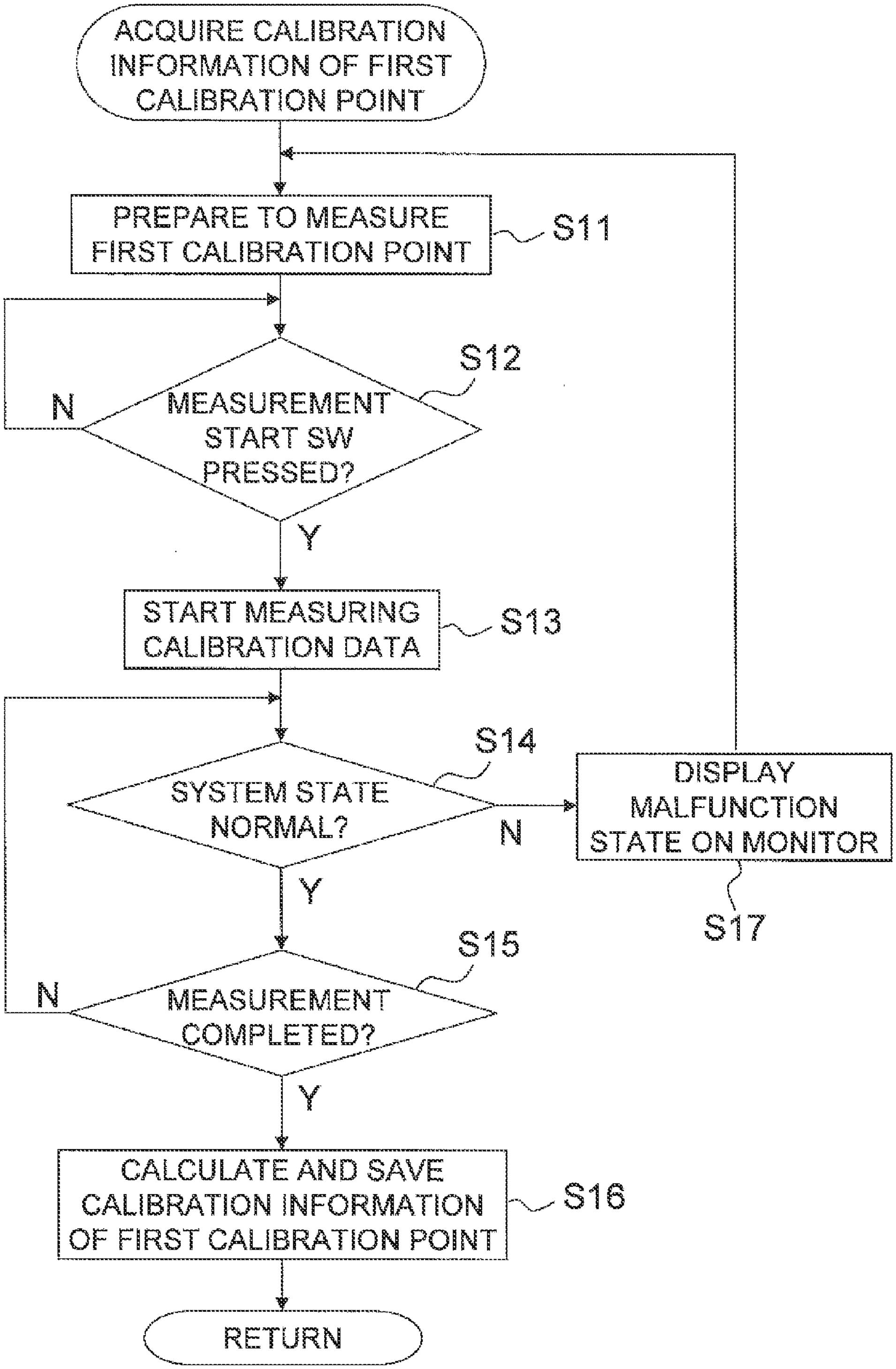
FIG. 6 is a flowchart showing a process for acquiring calibration information.
Figure 7:
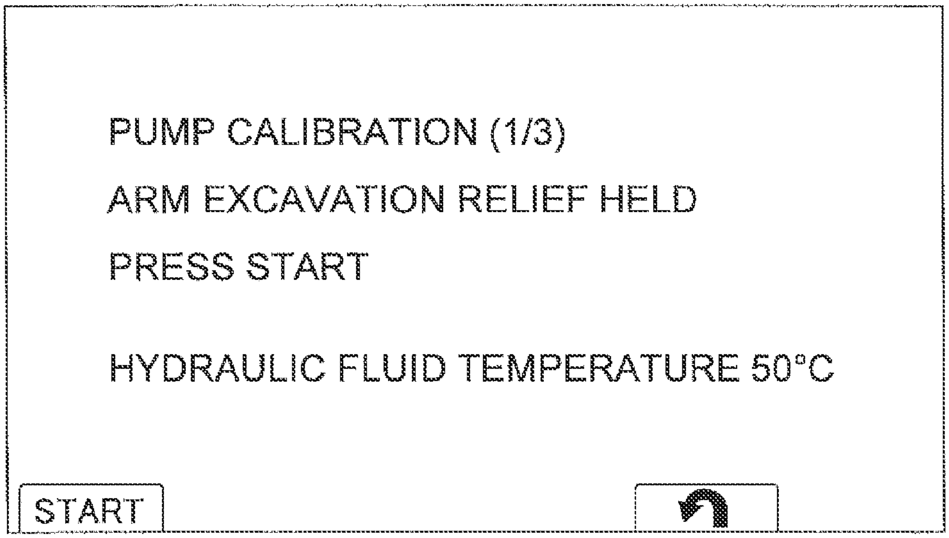
FIG. 7 is a diagram showing a screen displayed during calibration of command data.

FIG. 6 shows a flowchart showing the process for acquiring calibration information of the first calibration point P1. In Step S11, preparation for measurement of the first calibration point P1 is performed. Here, the output of the engine 21 and the absorption torque of the hydraulic pump 25 are controlled on the basis of an engine output torque line Le1 and a pump absorption torque line Lp1, which are set such that the output horsepower of the engine 21 and the absorption horsepower of the hydraulic pump 25 match at the first calibration point P1. At this time, a command current value for the pump control device 27 is calculated on the basis of the initial command data, and input to the pump control device 27. A display like that shown in FIG. 7 is displayed on the monitor of the display/input device 43 as well. Here, "arm excavation relief held" is a display for indicating the operator that the left work operating lever 35 is held in a state tilted to the maximum manual control level in the direction of operating the arm 8. In this state, the relief valve 44 is in the relief state, and therefore the hydraulic pressure supplied to the hydraulic actuators 10 to 12 and 30 to 32 is maintained stably at the relief pressure. A "START" touchpanel key is displayed on the display/input device 43 as well.

In Step S12, it is determined whether or not a measurement start switch is pressed. The measurement start switch refers to the "START" touchpanel key displayed on the input display device 43. The process advances to Step S13, when the operator presses the measurement start switch in a state with the left work operating lever 35 being held in a state tilted to the maximum manual control level in the direction of operating the arm 8.

In Step S13, measurement of calibration data starts. Here, data needed to calculate the calibration information of the first calibration point P1 is measured. The calibration information is composed of a command current value for the pump control device 27, and the absorption torque of the hydraulic pump 25 in an equilibrium state. The absorption torque of the hydraulic pump 25 is calculated through subtraction, from the output horsepower of the engine 21, of the horsepower for driving auxiliary systems of the engine 21, such as a cooling fan. Therefore, data necessary for calculating the output horsepower of the engine 21, the horsepower for driving auxiliary systems of the engine 21, etc., is measured by way of calibration data. For example, a cooling fan can be cited as an auxiliary system. In this case, in order to calculate the horsepower for driving the cooling fan, the controller 40 would measure the engine rotation speed as the calibration data. The controller 40 stores a relationship between the rotation speed of the cooling fan and the horsepower for driving the cooling fan, in the form of previously-derived fan rotation speed/driving horsepower data. The controller 40 calculates the rotation speed of the cooling fan from the measured engine rotation speed, and refers to the fan rotation speed/driving horsepower data in order to calculate the horsepower for driving the cooling fan. Additionally, the controller 40 refers to the engine output torque line in order to calculate the output horsepower of the engine from the measured engine rotation speed. The controller 40 then subtracts the horsepower for driving the cooling fan from the output horsepower of the engine in order to calculate the absorption horsepower of the hydraulic pump 25, and calculates the absorption torque of the hydraulic pump 25 from the absorption horsepower of the hydraulic pump 25.

Figure 8:
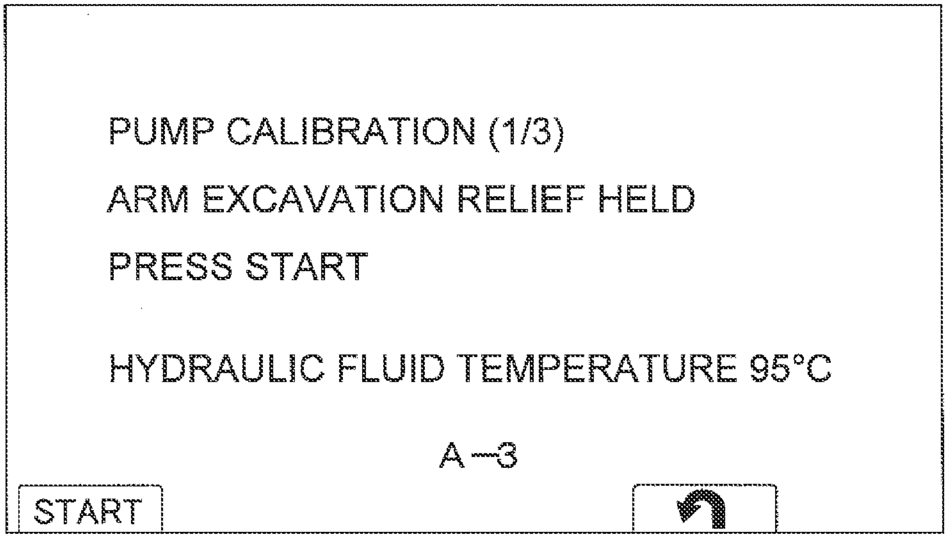
FIG. 8 is a diagram showing a screen displayed during calibration of command data.

In Step S14, it is determined whether or not the state of the system is normal. Here, it is determined whether or not the state of the work vehicle 100 is a state that is normal for the purpose of performing the calibration process. Specifically, it is determined whether the hydraulic fluid temperature is within the correct range, whether the discharge pressure of the hydraulic pump 25 is within the correct range, and whether the relief valve 44 is in the relief state. In a case in which at least one of these conditions for determination is not met, the process advances to Step S17. In Step S17, a malfunction state is displayed on the monitor of the display/input device 43. Here, as shown in FIG. 8, the hydraulic fluid temperature and a malfunction cause code corresponding to the cause of the malfunction state are displayed.

In a case in which it is decided in Step S14 that the system is in the normal state, the process advances to Step S15. In Step S15, it is determined whether or not measurement of the calibration data is completed. In a case in which measurement of the calibration data is completed, the process advances to Step S16.

In Step S16, the calibration information of the first calibration point P1 is calculated and saved to the storage unit 42.

Figure 9:
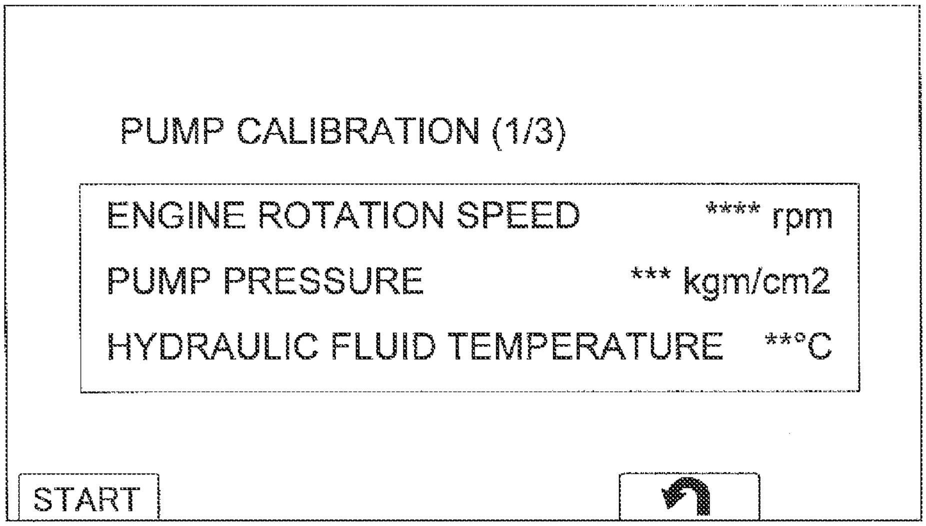
FIG. 9 is a diagram showing a screen displayed during calibration of command data.

Specifically, the actual absorption torque of the hydraulic pump 25 is detected in a state in which the output horsepower of the engine 21 and the absorption horsepower of the hydraulic pump 25 are matched; and then saved as calibration information, together with the command current value for the pump control device 27 at this time. As shown in FIG. 9, once acquisition of the calibration information of the first calibration point P1 is completed, average values of the engine rotation speed, the pump pressure (discharge pressure of the hydraulic pump 25), and the hydraulic fluid temperature observed during measurement of the calibration data are respectively displayed on the monitor of the display/input device 43.

The processes for acquisition of calibration information of the second calibration point P2 and acquisition of calibration information of the third calibration point P3 are analogous to the process for acquisition of calibration information of the first calibration point P1 discussed above. However, as mentioned previously, the values of pump absorption torque at the first to third calibration points P1 to P3 are respectively different. As shown in FIG. 5, the second calibration point P2 is a matching point that is specified by an engine output torque line Le2 different from the engine output torque line Le1 and a pump absorption torque line Lp2 different from the pump absorption torque line Lp1. Also, the third calibration point P3 is a matching point that is specified by an engine output torque line Le3 different from the engine output torque lines Le1, Le2, and a pump absorption torque line Lp3 different from the pump absorption torque lines Lp1, Lp2. Therefore, calibration information can be obtained in a plurality of equilibrium states associated with different pump absorption torque values.

Figure 10:
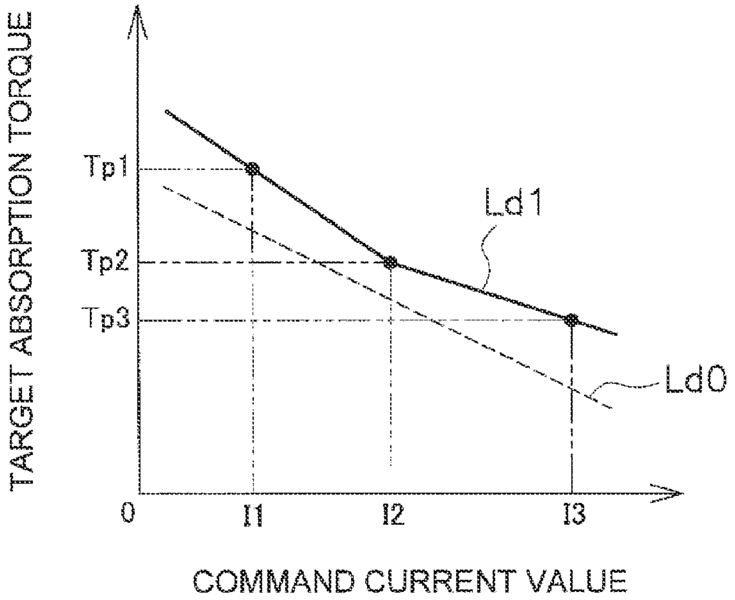
FIG. 10 is a diagram showing initial command data and calibrated command data.

The controller 40 subsequently controls the hydraulic pump 25 on the basis of the command data which is calibrated on the basis of the calibration information saved to the storage unit 42. FIG. 10 shows an example of command data calibrated on the basis of the calibration information. In FIG. 10, Ld0 shows the initial command data. Ld1 shows the calibrated command data. In the calibrated command data Ld1, the initial command data Ld0 is calibrated on the basis of the calibration information (I1, Tp1) of the first calibration point P1, the calibration information (I2, Tp2) of the second calibration point P2, and the calibration information (I3, Tp3) of the third calibration point P3. I1, I2, and I3 are command current values. Tp1, Tp2, and Tp3 are actual absorption torque of the hydraulic pump 25, corresponding to the command current values that were acquired as the calibration information.

Figure 11:
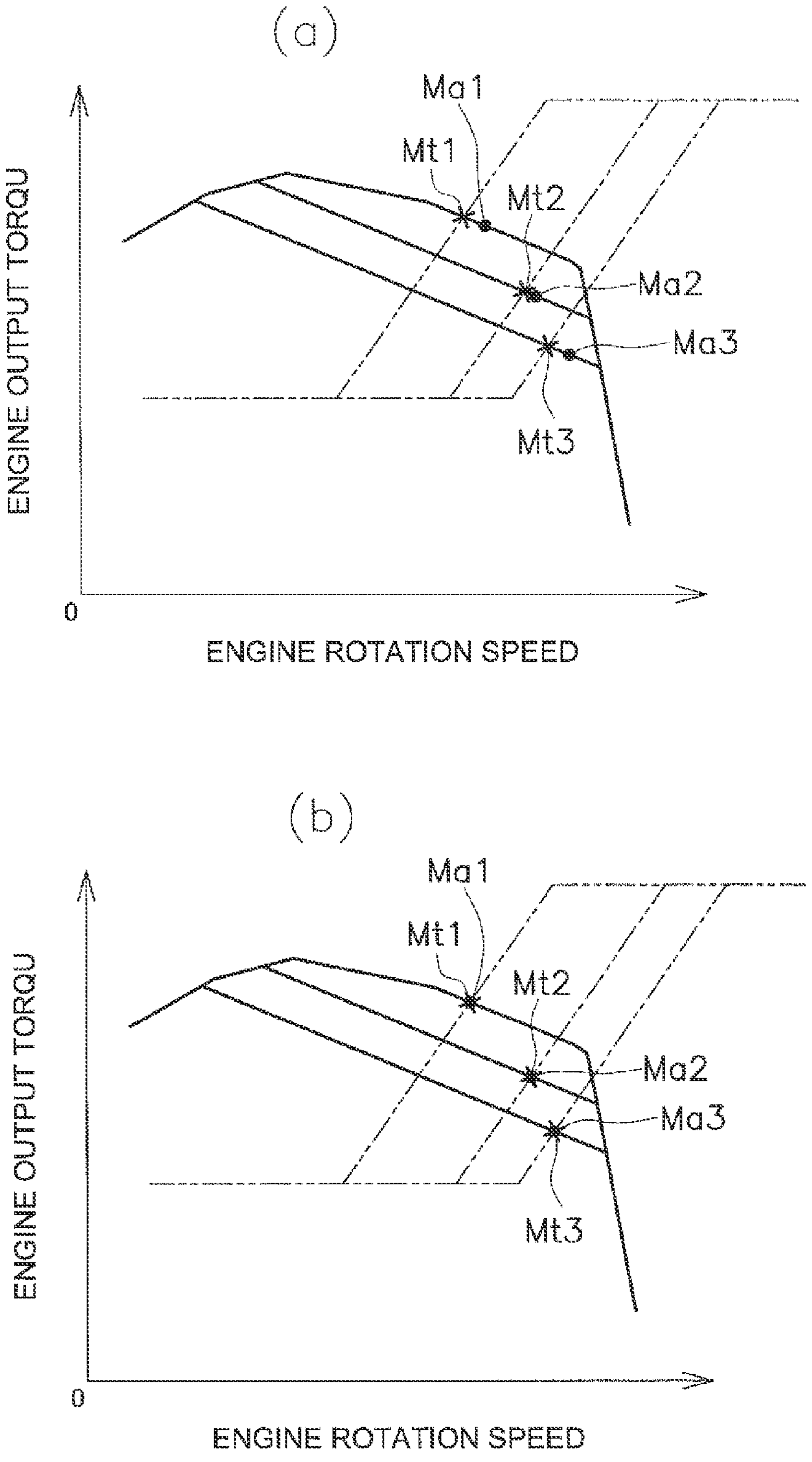
FIG. 11 is a diagram showing matching of output horsepower of an engine and absorption horsepower of a hydraulic pump, before calibration and after calibration of command data.

As shown in FIG. 11 (*a*), when control of the hydraulic pump 25 is performed on the basis of the initial command data, actual matching points Ma1 to Ma3 at which the output torque of the engine 21 and the absorption torque of the hydraulic pump 25 match are at positions shifted towards the high rotation speed end with respect to the target matching points Mt1 to Mt3. In contrast to this, when control of the hydraulic pump 25 is performed on the basis of the calibrated command data, the actual matching points Ma1 to Ma3 and the target matching points Mt1 to Mt3 are matched, as shown in FIG. 11(*b*).

Through manual control of the display/input device 43, the operator can delete calibration information stored in the storage unit 42, or restore the command data to the initial command data.

In the above manner, in the work vehicle 100 according to the present embodiment, through measurement of the actual absorption torque of the hydraulic pump 25 in equilibrium states in which the output horsepower of the engine 21 and the absorption horsepower of the hydraulic pump 25 are matched, calibration information is acquired and saved to the storage unit 42. The command data is then calibrated on the basis of this calibration information. Therefore, the absorption torque of the hydraulic pump 25 can be controlled accurately, regardless of individual differences among hydraulic pumps 25.

The calibration information is acquired in a state in which the hydraulic pump 25 is installed on the work vehicle 100, and calibration information suitable for actual conditions of service can therefore be acquired. Additionally, the process for inspecting the hydraulic pump 25 during manufacture, and the process for managing calibration information, can be simpler as compared with the case where calibration information is acquired prior to installation of the hydraulic pump 25 on the work vehicle 100, such as during manufacture of the work vehicle 100, etc.

Also, it is possible to reduce variability in performance of the work vehicle 100, such as fuel consumption or work capabilities due to individual differences among hydraulic pumps 25, because the absorption torque of the hydraulic pump 25 can be controlled accurately regardless of individual differences among hydraulic pumps 25.

The calibration information is acquired for a plurality of calibration points associated with different pump absorption torque values. Therefore, the command data can be corrected more accurately, as compared with the case where calibration information is acquired for a single calibration point only. In particular, as shown in FIG. 10, the relationship between command current values and actual pump absorption torque is not always limited to a linear proportional relationship. Therefore, the command data can be corrected more accurately through calibration based on calibration information of a plurality of calibration points. For example, there are instances in which the command data is set so as to approximate an equivalent horsepower line. Because an equivalent horsepower line is shown by a hyperbolic curve, it is difficult, using only single-point or two-point calibration, to accurately calibrate command data shown by a hyperbolic curve. Consequently, it is possible to calibrate command data with better accuracy through acquisition of three or more calibration points. Moreover, command data can be calibrated for a wider range of pump absorption torque, through calibration based on calibration information of a plurality of calibration points. Alternatively, command data can be calibrated for a specific range of pump absorption torque to be used in order to control the hydraulic pump 25. In so doing, command data can be calibrated with better accuracy.

Figure 15:
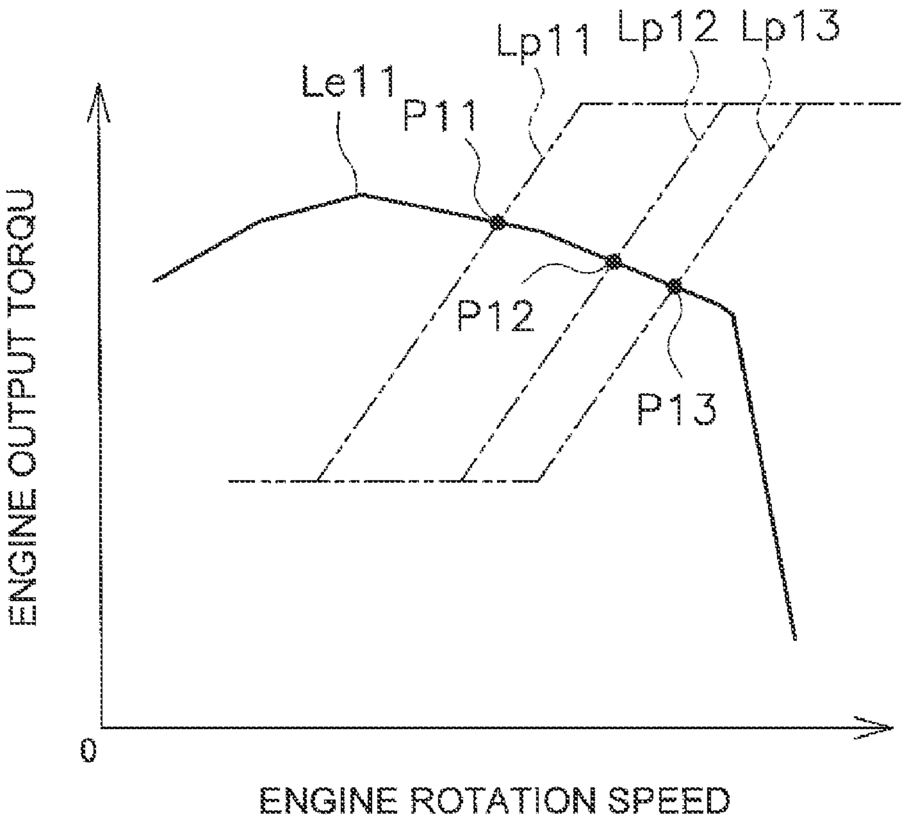
FIG. 15 shows calibration points according to another embodiment.

In particular, as shown in FIG. 5, by employing a plurality of calibration points specified by mutually different engine output torque lines Le1, Le2, Le3, command data can be calibrated for a wider range of pump absorption torque than would be the case if a plurality of calibration points on the same engine output torque line were used (see FIG. 15). Therefore, command data can be calibrated accurately within a practicable range of pump absorption torque.

Command data is calibrated while the relief valve 44 is in the relief state. Therefore, calibration points can be measured in a state in which a predetermined load is applied to the hydraulic pump 25, and in which the output horsepower of the engine 21 and the absorption horsepower of the hydraulic pump 25 are stably matched. In so doing, command data can be calibrated accurately.

Calibration of command data is executed when a calibration mode for the purpose of calibrating command data is selected. Therefore, control during normal operation is more stable, as compared to the case where calibration takes place during normal operation of the work vehicle 100.

The calibration mode is selected manually through manual control of the display/input device 43. Therefore, calibration of command data can be executed at any time, such as when the work vehicle 100 is shipped, or during maintenance.

Figure 12:
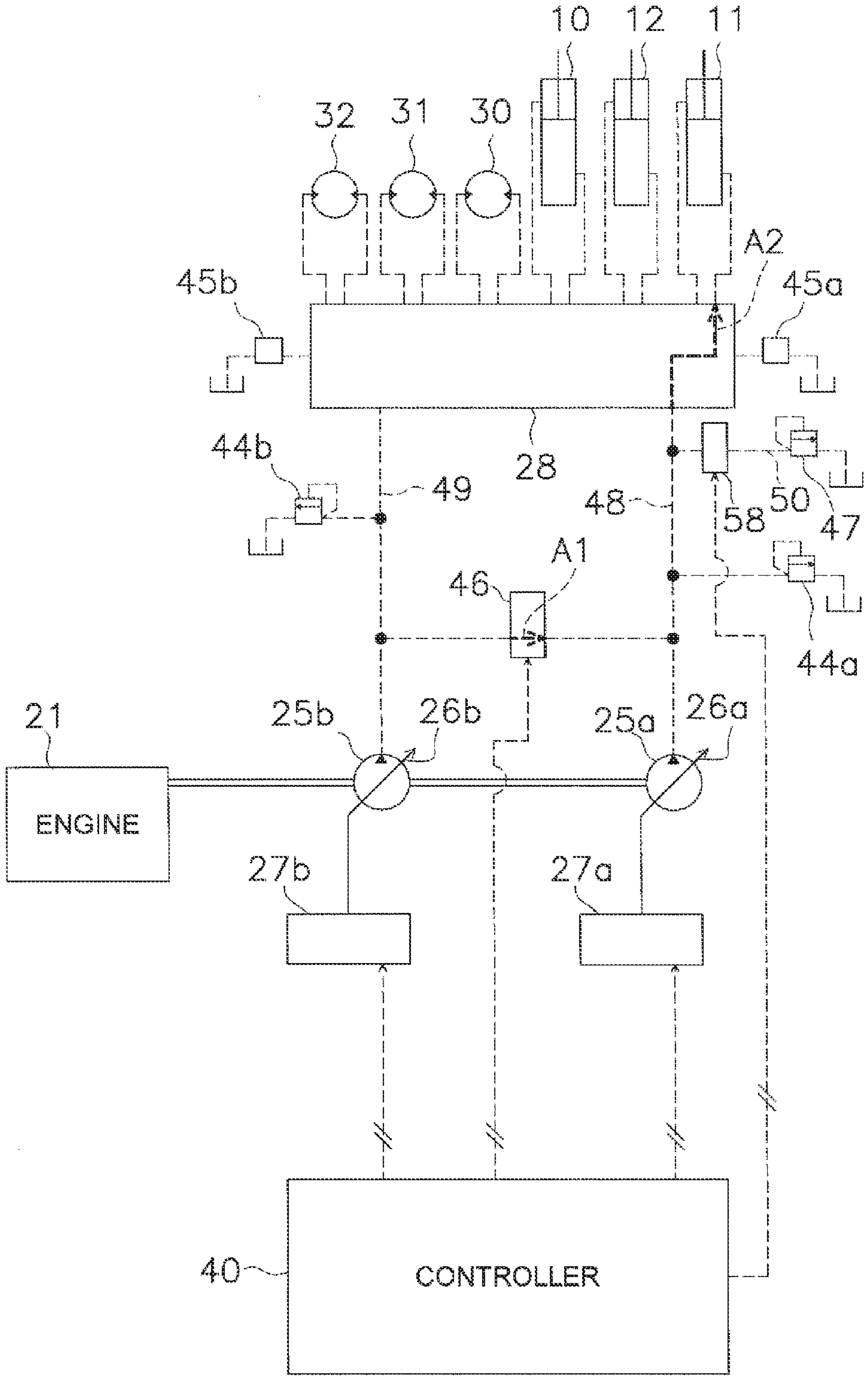
FIG. 12 is a block diagram showing part of the configuration of a control system of a work vehicle according to a second embodiment of the present invention.

Next, a work vehicle according to a second embodiment of the present invention is described. FIG. 12 is a block diagram showing part of the configuration of a control system of a work vehicle according to the second embodiment. This work vehicle is provided with a first hydraulic pump 25*a*, a second hydraulic pump 25*b*, a first pump control device 27*a*, a second pump control device 27*b*, a first relief valve 44*a*, a second relief valve 44*b*, a first unload valve 45*a*, a second unload valve 45*b*, a confluent/divided flow switching device 46, and a calibration relief valve 47. In FIG. 12, configurations the same as those of the work vehicle 100 of the first embodiment have been assigned the same reference numerals.

The first hydraulic pump 25*a* and the second hydraulic pump 25*b* are comparable in configuration to the hydraulic pump 25 of the first embodiment. The first pump control device 27*a* controls the absorption torque of the first hydraulic pump 25*a* in accordance with command current values input from the controller 40. The second pump control device 27*b* controls the absorption torque of the second hydraulic pump 25*b* in accordance with command current values input from the controller 40. The specific configurations of the first pump control device 27*a* and the second pump control device 27*b* are the same as that of the pump control device 27 of the first embodiment.

The first relief valve 44*a* is furnished to a first hydraulic circuit 48 linking the first hydraulic pump 25*a* and the hydraulic actuators 10 to 12 and 30 to 32. The second relief valve 4*b* is furnished to a second hydraulic circuit 49 linking the second hydraulic pump 25*b* and the hydraulic actuators 10 to 12 and 30 to 32. The specific configurations of the first relief valve 44*a* and the second relief valve 44*b* are comparable to the relief valve 44 of the first embodiment.

With the operating valve 28 closed, the first unload valve 45*a* enters the unload state, whereby the hydraulic pressure of the first hydraulic circuit 48 is maintained at a predetermined unload pressure. Specifically, when the supply of hydraulic fluid to the hydraulic actuators 10 to 12 and 30 to 32 via the first hydraulic circuit 48 is blocked, the first unload valve 45*a* enters the unload state, whereby the pressure of the hydraulic fluid is reduced to the unload pressure. The first hydraulic pump 25*a* thereby discharges hydraulic fluid in a substantially unloaded state into the first hydraulic circuit 48. With the operating valve 28 closed, the second unload valve 45*b* enters the unload state, whereby the hydraulic pressure of the second hydraulic circuit 49 is maintained at a predetermined unload pressure. The specific configuration of the second unload valve 45*b* is comparable to that of the first unload valve 45*a*.

The confluent/divided flow switching device 46 is switched between a confluent flow state and a divided flow state by a command signal from the controller 40. In the confluent flow state, the confluent/divided flow switching device 46 brings about confluent flow of the first hydraulic circuit 48 and the second hydraulic circuit 49. In the divided flow state, the confluent/divided flow switching device 46 brings about divided flow of the first hydraulic circuit 48 and the second hydraulic circuit 49. When the confluent/divided flow switching device 46 is in the divided flow state, the hydraulic fluid from the first hydraulic pump 25*a* is supplied via the first hydraulic circuit 48 to hydraulic actuators such as the right travel motor 31, the arm cylinder 11, etc. The hydraulic fluid from the second hydraulic pump 25*b* is supplied via the second hydraulic circuit 49 to hydraulic actuators such as the left travel motor 32, the bucket cylinder 12, etc.

The controller 40 differentiates among states of travel of the work vehicle and among operational states of the work machine 4 on the basis of detection signals input from various sensors. The controller 40 then switches the confluent/divided flow switching device 46 based on the differentiation results. Specifically, the controller 40 switches the confluent/divided flow switching device 46 to a state suited to the current state of travel and operational state. For example, when the work vehicle is in a stopped state while the work machine 4 is in state of being driven, the confluent/divided flow switching device 46 is switched to the confluent state. Sufficient hydraulic fluid can thereby be supplied to the hydraulic cylinders 10 to 12 of the work machine 4. In a case in which the work vehicle is traveling in a straight line while the work machine 4 is not being driven, the confluent/divided flow switching device 46 enters the divided state. The hydraulic fluid can thereby be distributed equally to the left and right travel motors 31, 32, and straightness of travel can be improved.

The calibration relief valve 47 is furnished to a calibration relief circuit 50. The calibration relief valve 47 enters a relief state at a hydraulic pressure (herein termed "calibration relief pressure") which is lower than the relief pressure of the first relief valve 44*a* and the relief pressure of second relief valve 44*b*. The calibration relief circuit 50 is connected to the first hydraulic circuit 48. The calibration relief circuit 50 is furnished with a flow channel switching device 58. The flow channel switching device 58 switches between a connecting state and a blocking state in accordance with a command signal from the controller 40. In the connecting state, the flow channel switching device 58 connects the calibration relief circuit 50 and the first hydraulic circuit 48. In the blocking state, the flow channel switching device 58 blocks the calibration relief circuit 50 and the first hydraulic circuit 48. In the normal operating state in which command data is not being calibrated, the flow channel switching device 58 is maintained in the blocking state.

When calibrating command data, the controller 40 places the confluent/divided flow switching device 46 in the confluent state. The controller 40 also places the flow channel switching device 58 in the connecting state. The command data is then calibrated by the process of the flowchart of FIG. 4 discussed previously. Consequently, the calibration of the command data takes place in a state in which the arm cylinder 11 is being supplied with a confluent flow of hydraulic fluid discharged from the first hydraulic pump 25*a* and hydraulic fluid discharged from the second hydraulic pump 25*b* (see the broken arrow lines A1 and A2). Additionally, at this time the hydraulic pressure of the first hydraulic circuit 48 is maintained at the calibration relief pressure by the calibration relief valve 47. During measurement of the calibration points P1, P2, P3 discussed previously, command signals of identical command current values are input to the first pump control device 27*a* and the second pump control device 27*b*. The actual total absorption torque of the first hydraulic pump 25*a* and the second hydraulic pump 25*b* in the equilibrium state is detected as well.

Other configurations and controls of the work vehicle of the second embodiment are comparable to the configurations and control in the first embodiment.

In the work vehicle of the second embodiment, calibration of command data can take place in a state in which the hydraulic pressure of the first hydraulic circuit 48 and the second hydraulic circuit 49 is equal to a calibration relief pressure which is lower than the relief pressure. Here, a pressure value that is used at high frequency during normal operation is derived in advance and set as the calibration relief pressure. The calibration accuracy of command data in a state approximating that during normal operation can be improved thereby. Whereas the work vehicle of the second embodiment is provided with the first hydraulic pump 25*a* and the second hydraulic pump 25*b*, the calibration relief valve 47 could be provided in a vehicle provided with a single hydraulic pump 25 like the work vehicle 100 of the first embodiment as well.

Figure 13:
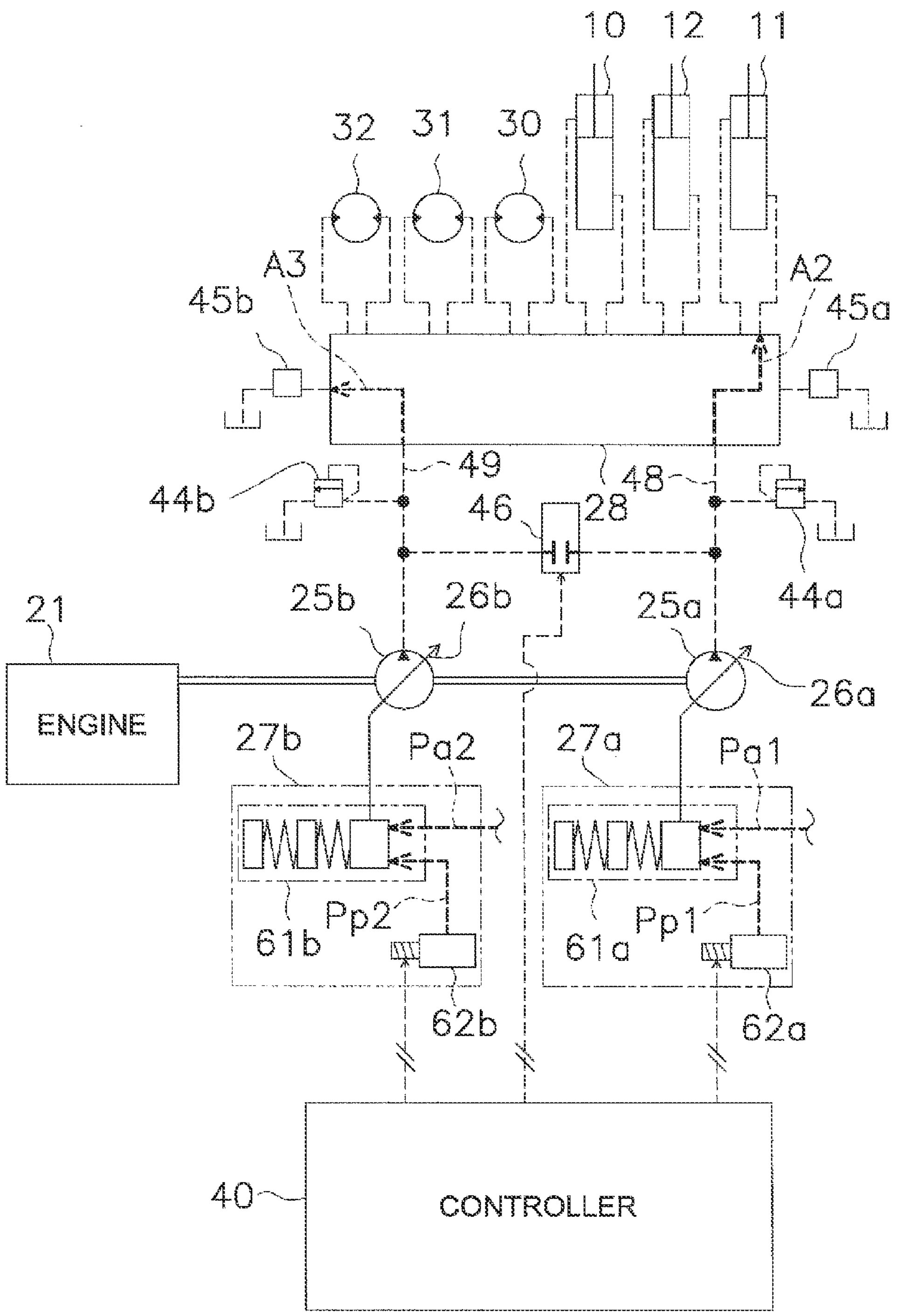
FIG. 13 is a block diagram showing part of the configuration of a control system of a work vehicle according to a third embodiment of the present invention.

Next, a work vehicle according to a third embodiment of the present invention is described. FIG. 13 is a block diagram showing part of the configuration of a control system of the work vehicle according to a third embodiment. The configuration of this work vehicle is similar to that of work vehicle of the second embodiment, but the calibration relief valve 47 and the flow channel switching device 58 are omitted. In FIG. 13, configurations the same as those of the work vehicles of the first embodiment and the second embodiment have been assigned the same reference numerals. In the present embodiment, rather than employing the calibration relief valve 47 as in the second embodiment discussed previously, hydraulic pressure lower than the relief pressure is obtained by employing an average pressure of the hydraulic pressure of the first hydraulic circuit 48 and the hydraulic pressure of the second hydraulic circuit 49, as will be discussed later. The configuration is described in specific terms below.

The first pump control device 27*a* includes a first servo cylinder 61*a* and a first EPC valve 62*a*. To the first servo cylinder 61*a* are input an average pressure of the first hydraulic circuit 48 and the second hydraulic circuit 49 (see the broken line arrow Pa1), and a controlling hydraulic pressure from the first EPC valve 62*a* (see the broken line arrow Pp1). The first servo cylinder 61*a* is furnished with a spring that gives rise to reaction force in opposition to the average pressure and the controlling hydraulic pressure. Depending on the balance of the average pressure, the controlling hydraulic pressure, and the reaction force of the spring, the first servo cylinder 61*a* changes the tilting angle of a swash plate 26*a* of the first hydraulic pump 25*a*. The first EPC valve 62*a* generates the controlling hydraulic pressure on the basis of a command value of a command signal input from the controller 40, and drives the first servo cylinder 61*a*.

The second pump control device 27*b* includes a second servo cylinder 61*b* and a second EPC valve 62*b*. To the second servo cylinder 61*b* are input an average pressure of the first hydraulic circuit 48 and the second hydraulic circuit 49 (see the broken line arrow Pa2), and a controlling hydraulic pressure from the second EPC valve 62*b* (see the broken line arrow Pp2). The second servo cylinder 61*b* is furnished with a spring that gives rise to reaction force in opposition to the average pressure and the controlling hydraulic pressure. Depending on the balance of the average pressure, the controlling hydraulic pressure, and the reaction force of the spring, the second servo cylinder 61*b* changes the tilting angle of a swash plate 26*b* of the second hydraulic pump 25*b*. The second EPC valve 62*b* generates the controlling hydraulic pressure on the basis of a command value of a command signal input from the controller 40, and drives the second servo cylinder 61*b*.

The controller 40 determines the command value (command current signal) of the command signal that is input to the first EPC valve 62*a* and the command value (command current signal) of the command signal that is input to the second EPC valve 62*b*, in such a way that the total of the absorption torque of the first hydraulic pump 25*a* and the second hydraulic pump 25*b* does not exceed a set torque. During this time, the controller 40 employs the command data discussed earlier to determine the command values.

When calibrating the command data, the controller 40 places the confluent/divided flow switching device 46 in the divided flow state. The command data is then calibrated by the process of the flowchart shown in FIG. 4 discussed previously. Consequently, the hydraulic fluid discharged from the first hydraulic pump 25*a* is supplied to the arm cylinder 11 via the first hydraulic circuit 48 (see the broken line arrow A2), and the command data is calibrated while the first relief valve 44 is in the relief state. Because there is no manual control of the boom cylinder 10, the bucket cylinder 12, the revolution motor 30, or the traveling devices 2*a* and 2*b*, the hydraulic pressure of the second hydraulic circuit 49 is maintained at the unload pressure (see the broken line arrow A3) by the second unload valve 45*b*. Consequently, the command data is calibrated when the confluent/divided flow switching device 46 is in the divided flow state, the first relief valve 44*a* is in the relief state, and the hydraulic pressure of the second hydraulic circuit 49 is at the unload pressure. When measuring the calibration points P1, P2, P3 discussed above, command signals of identical command current values are input to the first pump control device 27*a* and the second pump control device 27*b*. However, the command current value input to the first pump control device 27*a* and the command current value input to the second pump control device 27*b* during normal operation need not necessarily be identical values. Moreover, the command data for determining the command current value for the first pump control device 27*a* and the command data for determining the command current value for the second pump control device 27*b* need not necessarily be the same. When measuring the calibration points P1, P2, P3, the actual total absorption torque of the first hydraulic pump 25*a* and the second hydraulic pump 25*b* in equilibrium states is detected.

Other configurations and controls of the work vehicle of the third embodiment are comparable to the configurations and control of the work vehicle in the second embodiment.

In the work vehicle of the third embodiment, the command data is calibrated when the hydraulic pressure of the first hydraulic circuit 48 is at the relief pressure, and the hydraulic pressure of the second hydraulic circuit 49 is at the unload pressure. As discussed previously, the unload pressure is the hydraulic pressure of the second hydraulic circuit 49 when the second hydraulic pump 25*b* is in the substantially unloaded state, and therefore is a very small value in comparison with the relief pressure. Consequently, the average pressure input to the first pump control device 27*a* and the second pump control device 27*b* can be lower than the relief pressure, and the value can approximate the calibration relief pressure discussed previously. For example, assume that the pressure value having high frequency usage during normal operation (herein termed the "calibration target pressure value") is 240 $kg/cm^2$. Assume also that the relief pressure is 410 $kg/cm^2$, and the unload pressure is 30 $kg/cm^2$. In this case, the average pressure of the first hydraulic circuit 48 and the second hydraulic circuit 49 would be 220 $kg/cm^2$. Consequently, the average pressure is a value that more closely approximates the calibration target pressure value that it does the relief pressure. Therefore, calibration can take place in a state in which the tilting angles of the swash plates 26*a* and 26*b* of the first hydraulic pump 25*a* and the second hydraulic pump 25*b* approximate the tilting angles thereof when the discharge pressure is equal to the calibration target pressure value. Therefore, even if the calibration relief valve 47 shown in the second embodiment is not equipped, the accuracy of calibration of the command data in a state approximating normal operation can be improved.

Typically, discharge of hydraulic fluid from a hydraulic pump is affected by the actual discharge pressure and flow rate. Therefore, correction data should be employed to correct the calibration data. The correction data is data for correcting differences between calibration data derived by the aforedescribed method, and calibration data obtained in a state in which the actual discharge pressure has the same value as the aforedescribed average pressure. This data has been obtained experimentally in advance, and is stored in the storage unit 42 (see FIG. 2). The accuracy of calibration of the command data can be further improved thereby.

Calibration may also take place in two states, i.e., a state in which the hydraulic pressure of the first hydraulic circuit 48 is at the relief pressure, and the hydraulic pressure of the second hydraulic circuit 49 is at the unload pressure; and a state in which the hydraulic pressure of the second hydraulic circuit 49 is at the relief pressure, and the hydraulic pressure of the first hydraulic circuit 48 is at the unload pressure. The average of the calibration values in the two states may then be employed as the calibration data. The effects of variability of performance of the two hydraulic pumps 25*a* and 25*b* on the accuracy of calibration can be reduced thereby.

While the present invention has been described herein in terms of presently preferred embodiments, the present invention is not limited by the embodiments set forth above, and various modifications and improvements thereto are possible without departing from the scope and spirit of the present invention.

The present invention is not limited to a hydraulic excavator, and can be implemented in other types of work vehicles, such as a wheel loader.

The controller 40 may be constituted by a plurality of computers.

Calibration of command data at pressure frequently used during normal operation is accomplished through input, to the pump control devices, of hydraulic pressure that is lower than the relief pressure during normal operation. However, the specific means for doing so is not limited to those taught in the aforedescribed embodiments. For example, a variable relief valve may be furnished in place of the first relief valve 44*a* in the second embodiment. The variable relief valve is a valve having variable relief pressure. The variable relief valve is controlled in a manner such that, during calibration of command data, the relief pressure is a lower pressure than during normal operation. Therefore, even without equipping the calibration relief valve 47, calibration of command data can take place in a state in which the hydraulic pressure of the first hydraulic circuit 48 and the second hydraulic circuit 49 is at lower pressure than the relief pressure during normal operation.

Figure 14:
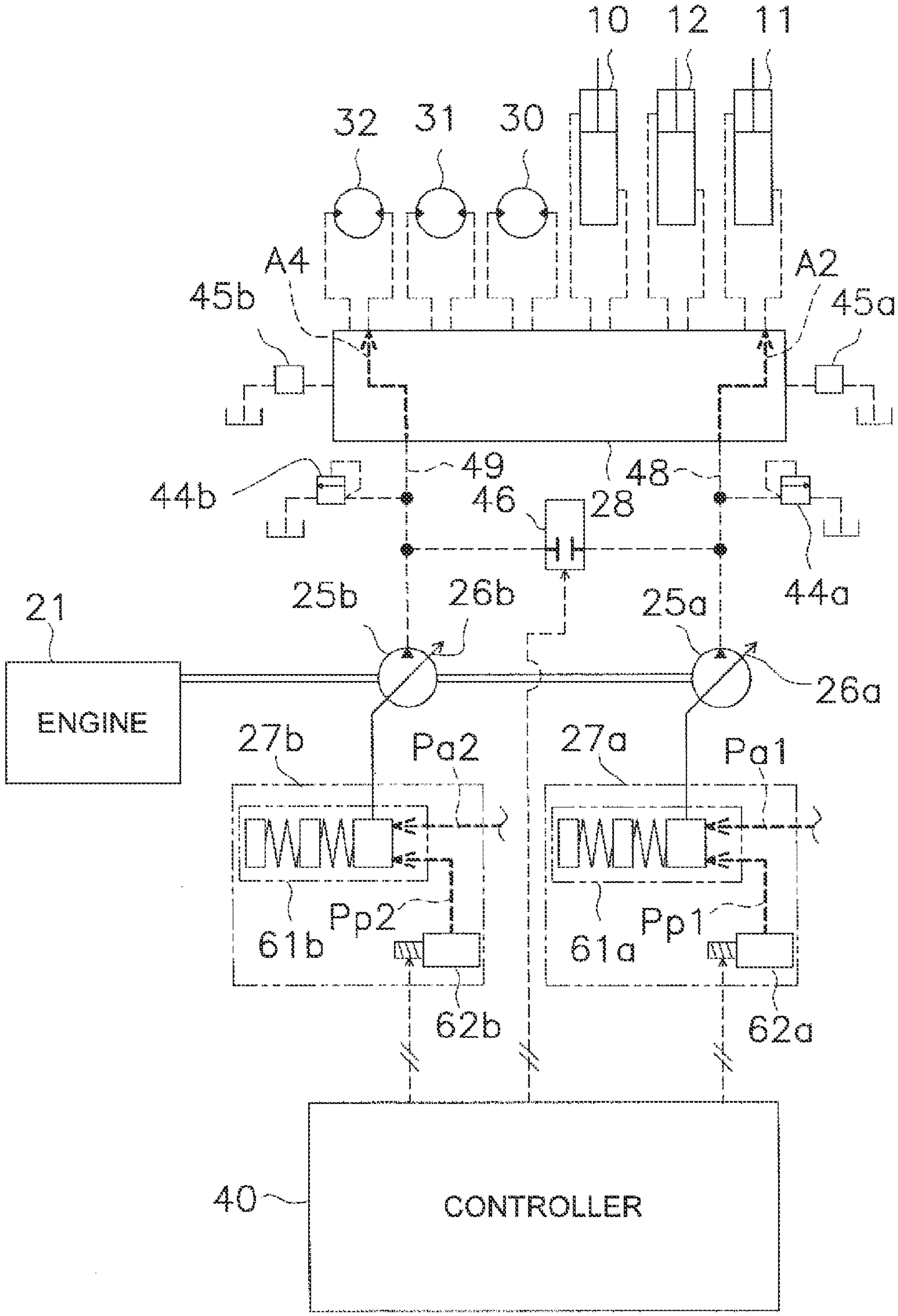
FIG. 14 is a block diagram showing part of the configuration of a control system of a work vehicle according to another embodiment of the present invention.

A predetermined low hydraulic pressure lower than the relief pressure may also be obtained by supplying hydraulic fluid to a predetermined hydraulic actuator, rather than utilizing an unload valve as taught in the third embodiment. For example, as shown in FIG. 14, hydraulic fluid from the first hydraulic pump 25*a* is supplied to the arm cylinder 11 (see the broken line arrow A2), and the first relief valve 44*a* enters the relief state. Additionally, the second hydraulic circuit 49 is connected to the left travel motor 32, and hydraulic fluid from the second hydraulic pump 25*b* is supplied to the left travel motor 32 (see the broken line arrow A4). The left travel motor 32 is then idled. Therefore, the second hydraulic circuit 49 is supplied, albeit at low pressure, with hydraulic fluid at a flow rate comparable to that in the case of a system equipped with a calibration relief valve and having entered the relief state. The hydraulic pressure of the second hydraulic circuit 49 can thereby be adjusted to a low hydraulic pressure, by supplying hydraulic fluid to a predetermined hydraulic actuator. Therefore, the average pressure that is input to the first pump control device 27*a* and the second pump control device 27*b* can be brought into closer approximation with the calibration target pressure value. For example, in a case in which the calibration target pressure value is 240 $kg/cm^2$ and the relief pressure is 410 $kg/cm^2$, hydraulic fluid would be supplied to the left travel motor 32 in a manner such that the hydraulic pressure of the second hydraulic circuit 49 reaches 70 $kg/cm^2$. Therefore, the average pressure would reach 240 $kg/cm^2$, and could be matched with the calibration target pressure value. Additionally, because hydraulic fluid from the second hydraulic pump 25*b* is supplied to the left travel motor 32, the second hydraulic pump 25*b* discharges hydraulic fluid at a sufficient flow rate. Because of this, the values of the correction data discussed previously can be smaller. Therefore, estimated error of the correction data can be smaller, and the accuracy of calibration can be improved further.

In the third embodiment discussed above, average pressure of the first hydraulic circuit 48 and the second hydraulic circuit 49 was employed; however, there is no limitation to average pressure, and any predetermined controlling pressure controlled by the first hydraulic circuit 48 and the second hydraulic circuit 49 would be acceptable as well.

Figure 16:
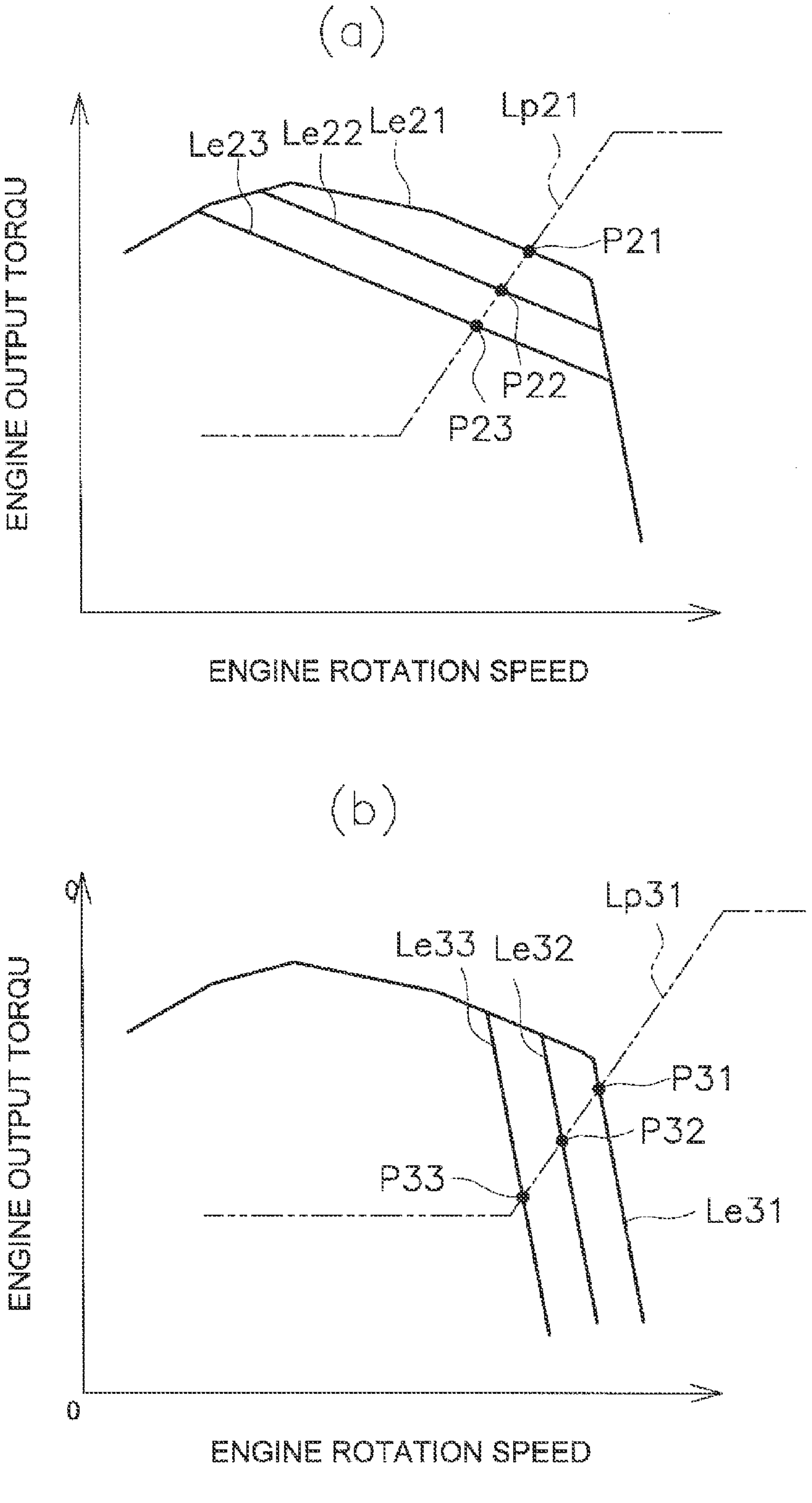
FIG. 16 shows calibration points according to another embodiment.

The number of calibration points for the purpose of obtaining calibration information is not limited to three, and could instead be two or fewer, or four or more. The plurality of calibration points measured are not limited to the calibration points shown in FIG. 5. For example, as shown in FIG. 15, calibration information may be obtained for a plurality of calibration points P11 to P13 corresponding to mutually different pump absorption torque lines Lp11 to Lp13 with respect to a common engine output torque line Le11. Alternatively, as shown in FIG. 16 (*a*), calibration point information may be obtained for a plurality of calibration points P21 to P23 corresponding to mutually different engine output torque lines Le21 to Le23 with respect to a common pump absorption torque line Lp21. Or, as shown in FIG. 16 (*b*), calibration point information may be obtained for a plurality of calibration points P31 to P33 corresponding to a plurality of output torque lines Le31 to Le33 having mutually different engine regulation lines, with respect to a common pump absorption torque line Lp31.

The actual absorption torque of the hydraulic pump 25 constituting the calibration information may be calculated from the discharge flow rate and the discharge pressure of the hydraulic pump 25.

The calibration mode may be selected automatically by the controller 40. For example, calibration of command data may be executed automatically upon startup of the engine 21.

The illustrated embodiment provides a work vehicle and a control method for a work vehicle, whereby absorption torque can be controlled accurately regardless of individual differences among hydraulic pumps.

The invention claimed is:

1. A work vehicle comprising:

an engine;

a hydraulic pump driven by the engine;

a hydraulic actuator driven by hydraulic fluid discharged from the hydraulic pump;

a pump control device configured to control an absorption torque of the hydraulic pump in accordance with a command value of an input command signal;

a storage unit configured to store command data showing correspondence between the command value of the command signal to the pump control device and the absorption torque of the hydraulic pump; and a control unit configured to calculate a target absorption torque of the hydraulic pump such that an output torque of the engine and the absorption torque of the hydraulic pump are matched at a target matching rotation speed of the engine, the control unit being configured to refer to the command data when calculating the command value corresponding to the target absorption torque, and the control unit being configured to output the command signal of the calculated command value to the pump control device, wherein the control unit is configured to calculate the absorption torque of the hydraulic pump in an equilibrium state in which an output horsepower of the engine and an absorption horsepower of the hydraulic pump are matched, to acquire calibration information including the calculated absorption torque of the hydraulic pump and the command value of the command signal being output to the pump control unit in the equilibrium state, and to calibrate the command data on the basis of the calibration information.

2. The work vehicle according to claim 1, wherein the control unit is configured to acquire the respective calibration information in a plurality of equilibrium states in which the absorption torques differ, and to calibrate the command data on the basis of the plurality of acquired calibration information.

3. The work vehicle according to claim 2, wherein the engine is controlled on the basis of engine output torque lines specifying a relationship between an engine rotation speed and upper limit values of the output torque of the engine; and the control unit is configured to acquire the calibration information in the plurality of equilibrium states corresponding to the plurality of mutually different engine output torque lines.

4. The work vehicle according to claim 2, wherein the hydraulic pump is controlled on the basis of pump absorption torque lines specifying a relationship between an engine rotation speed and the absorption torque of the hydraulic pump; and the control unit is configured to acquire the calibration information in a plurality of equilibrium states corresponding to the plurality of mutually different pump absorption torque lines.

5. The work vehicle according to claim 1, further comprising a relief device furnished to a hydraulic circuit that supplies the hydraulic fluid from the hydraulic pump to the hydraulic actuator, and configured to enter a relief state when the hydraulic pressure of the hydraulic circuit reaches a relief pressure, whereby preventing the hydraulic pressure of the hydraulic circuit from exceeding the relief pressure, wherein the command data is calibrated when the relief device is in the relief state.

6. The work vehicle according to claim 1, further comprising a relief device furnished to a hydraulic circuit that supplies the hydraulic fluid from the hydraulic pump to the hydraulic actuator, and configured to enter a relief state when the hydraulic pressure of the hydraulic circuit reaches a relief pressure, whereby preventing the hydraulic pressure of the hydraulic circuit from exceeding the relief pressure, and a calibration relief device furnished to the hydraulic circuit, and configured to enter a relief state at lower hydraulic pressure than the relief pressure of the relief device, wherein the command data is calibrated when the calibration relief device is in the relief state.

7. The work vehicle according to claim 5, further comprising a second hydraulic pump driven by the engine, a second hydraulic actuator driven by hydraulic fluid discharged from the second hydraulic pump, a second pump control device configured to control an absorption torque of the second hydraulic pump in accordance with a command value of an input command signal, and a confluent/divided flow switching device configured to switch between a confluent flow state in which a hydraulic circuit for supplying the hydraulic fluid from the hydraulic pump to the hydraulic actuator, and a second hydraulic circuit for supplying the hydraulic fluid from the second hydraulic pump to the second hydraulic actuator are merged each other, and a divided flow state in which the hydraulic circuit and the second hydraulic circuit are separated from each other, wherein a predetermined controlling hydraulic pressure controlled by the hydraulic circuit and the second hydraulic circuit is input to the pump control device and the second pump control device, the pump control device is configured to regulate a discharge flow rate of the hydraulic pump in accordance with the predetermined controlling hydraulic pressure, in a manner such that the absorption torque of the hydraulic pump does not exceed a value in accordance with the command value of the command signal input from the control unit;

the second pump control device is configured to regulate a discharge flow rate of the second hydraulic pump in accordance with the predetermined controlling hydraulic pressure, in a manner such that the absorption torque of the second hydraulic pump does not exceed a value in accordance with the command value of the command signal input from the control unit; and the command data is calibrated when the confluent/divided flow switching device is in the divided flow state, the relief device is in the relief state, and the hydraulic pressure of the second hydraulic circuit is a predetermined low hydraulic pressure lower than the relief pressure.

8. The work vehicle according to claim 1, wherein calibration of the command data is executed when a calibration mode for calibration of the command data is selected.

9. The work vehicle according to claim 8, further comprising an input device configured and arranged to be operated to instruct selection of the calibration mode.

10. A control method for a work vehicle including an engine, a hydraulic pump driven by the engine, a hydraulic actuator driven by hydraulic fluid discharged from the hydraulic pump, a pump control device for controlling an absorption torque of the hydraulic pump in accordance with a command value of an input command signal, and a storage unit for storing command data showing correspondence between the command value of the command signal to the pump control device and the absorption torque of the hydraulic pump, the control method comprising:

a step of calculating a target absorption torque of the hydraulic pump such that an output torque of the engine and the absorption torque of the hydraulic pump are matched at a target matching rotation speed of the engine;

a step of referring to the command data when calculating the command value corresponding to the target absorption torque, and outputting the command signal of the calculated command value to the pump control device;

a step of calculating the absorption torque of the hydraulic pump in an equilibrium state in which an output horsepower of the engine and an absorption horsepower of the hydraulic pump are matched;

a step of acquiring calibration information including the calculated absorption torque of the hydraulic pump, and the command value of the command signal being output to the pump control unit in the equilibrium state; and a step of calibrating the command data on the basis of the calibration information.

11. The control method for a work vehicle according to claim 10, wherein the work vehicle further includes a relief device, the relief device is furnished to a hydraulic circuit that supplies the hydraulic fluid from the hydraulic pump to the hydraulic actuator, and is configured to enter a relief state when the hydraulic pressure of the hydraulic circuit reaches a relief pressure, whereby preventing the hydraulic pressure of the hydraulic circuit from exceeding the relief pressure, and the command data is calibrated when the relief device is in the relief state.

12. The control method for a work vehicle according to claim 11, wherein the work vehicle further includes a second hydraulic pump driven by the engine, a second hydraulic actuator driven by hydraulic fluid discharged from the second hydraulic pump, a second pump control device for controlling an absorption torque of the second hydraulic pump in accordance with a command value of an input command signal, and a confluent/divided flow switching device configured to switch between a confluent flow state in which a hydraulic circuit for supplying the hydraulic fluid from the hydraulic pump to the hydraulic actuator and a second hydraulic circuit for supplying the hydraulic fluid from the second hydraulic pump to the second hydraulic actuator are merged each other, and a divided flow state in which the hydraulic circuit and the second hydraulic circuit are separated from each other, and wherein a predetermined controlling hydraulic pressure controlled by the hydraulic circuit and the second hydraulic circuit is input to the pump control device and the second pump control device, the pump control device is configured to regulate a discharge flow rate of the hydraulic pump in accordance with the predetermined controlling hydraulic pressure, in a manner such that absorption torque of the hydraulic pump does not exceed a value in accordance with the command value of the command signal input from the control unit, the second pump control device is configured to regulate a discharge flow rate of the second hydraulic pump in accordance with the predetermined controlling hydraulic pressure, in a manner such that absorption torque of the second hydraulic pump does not exceed a value in accordance with the command value of the command signal input from the control unit, and the command data is calibrated when the confluent/divided flow switching device is in the divided flow state, the relief device is in the relief state, and the hydraulic pressure of the second hydraulic circuit is a predetermined low hydraulic pressure lower than the relief pressure.

13. The control method for a work vehicle according to claim 12, wherein the work vehicle further includes an unload device, the unload device enters an unload state when supply of the hydraulic fluid to the second hydraulic actuator via the second hydraulic circuit is blocked, and thereby reduces the hydraulic pressure of the second hydraulic circuit to an unload pressure lower than the relief pressure, and the command data is calibrated when the confluent/divided flow switching device is in the divided flow state, the relief device is in the relief state, and the unload device is in the unload state.

* * * * *